US008676708B1

(12) United States Patent
Honey

(10) Patent No.: US 8,676,708 B1
(45) Date of Patent: Mar. 18, 2014

(54) METHODS AND APPARATUS FOR FACILITATING A FINANCIAL TRANSACTION

(75) Inventor: Thomas Honey, Panama City Beach, FL (US)

(73) Assignee: Aton Behavioral Finance, LLC, Naperville, IL (US)

( * ) Notice: Subject to any disclaimer, the term of this patent is extended or adjusted under 35 U.S.C. 154(b) by 97 days.

(21) Appl. No.: 13/283,372

(22) Filed: Oct. 27, 2011

Related U.S. Application Data

(60) Provisional application No. 61/408,153, filed on Oct. 29, 2010, provisional application No. 61/526,827, filed on Aug. 24, 2011.

(51) Int. Cl.
*G06Q 40/00* (2012.01)
(52) U.S. Cl.
USPC .......... 705/44; 235/375; 235/380; 705/14.17; 705/16; 705/30; 705/35; 705/39; 705/40
(58) Field of Classification Search
None
See application file for complete search history.

(56) References Cited

U.S. PATENT DOCUMENTS

| | | | | |
|---|---|---|---|---|
| 6,820,803 | B1* | 11/2004 | Browning et al. | 235/380 |
| 6,886,741 | B1* | 5/2005 | Salveson | 235/375 |
| 7,104,443 | B1* | 9/2006 | Paul et al. | 235/380 |
| 8,145,522 | B2* | 3/2012 | Warren et al. | 705/14.17 |
| 8,341,076 | B1* | 12/2012 | Wilkes | 705/39 |
| 2004/0117302 | A1* | 6/2004 | Weichert et al. | 705/40 |
| 2004/0143527 | A1* | 7/2004 | Benkert et al. | 705/35 |
| 2008/0228638 | A1* | 9/2008 | Scipioni et al. | 705/39 |
| 2009/0164351 | A1* | 6/2009 | Sorbe et al. | 705/30 |
| 2010/0274718 | A1* | 10/2010 | Ghosh et al. | 705/44 |
| 2011/0087590 | A1* | 4/2011 | Wilkes | 705/39 |
| 2011/0131103 | A1* | 6/2011 | Hirka et al. | 705/16 |
| 2012/0072342 | A1* | 3/2012 | Bohn | 705/40 |
| 2013/0110712 | A1* | 5/2013 | Schamer et al. | 705/40 |

FOREIGN PATENT DOCUMENTS

WO  WO 95/12169  * 5/1995

OTHER PUBLICATIONS

Sun Microsystems, Inc., Schema for Representing CORBA Objects in an LDAP directory, May 21, 1999, pp. 1-9.*
Derman, B., "Re-coupled Debit? The TSYS Hybrid Card", <http://paymentsviews.com/2010/02/16/re-coupled-debit-the-tsys-hybrid-card/>, Feb. 16, 2010, 7 pages.

* cited by examiner

*Primary Examiner* — Robert Niquette
(74) *Attorney, Agent, or Firm* — Drinker Biddle & Reath LLP

(57) ABSTRACT

A method is provided for authorizing a financial transaction of a consumer, comprising: issuing a card to a cardholder by a card-issuing financial institution; creating a card account associated with the card and the cardholder; creating a deposit account associated with the cardholder; creating a liability payment remittance account associated with the cardholder; associating the card with the deposit account and the payment remittance account; and placing money in the deposit account; receiving a request for authorization for a transaction from a clearing system by the card-issuing financial institution; and if adequate resources exist, transferring funds from the deposit account to the payment remittance account; and authorizing the purchase transaction; thereby building an outstanding balance on the credit card account; applying a funds debit or charge to the payment remittance account; and crediting the credit card account for an amount of payment.

17 Claims, 13 Drawing Sheets

METHODS AND APPARATUS FOR FACILITATING A FINANCIAL TRANSACTION

CROSS REFERENCE TO RELATED APPLICATIONS

The present application claims the benefit of U.S. Provisional Application No. 61/408,153, filed Oct. 29, 2010, entitled, "Methods and Apparatus for Facilitating a Financial Transaction", and U.S. Provisional Application No. 61/526,827, filed Aug. 24, 2011, entitled, "Methods and Apparatus for Facilitating a Financial Transaction", both herein incorporated by reference.

BACKGROUND

The present invention relates to the use of financial institution transaction payment cards to facilitate commercial transactions, more particularly to the use of a credit card that can be used to conduct credit purchase transactions for goods and services and credit cash advance transactions to obtain cash.

The technology of payment commerce has adopted a number of terms that are, as used herein, defined as follows, although the terms are not limited exclusively to these definitions.

TABLE 1

| | Definitions |
|---|---|
| Acquirer | The financial institution, an independent sales agent of the financial institution, and/or financial institution processor that receives from the merchant the financial data relating to a transaction, obtains authorization for the transaction, obtains the funds from the issuer, and remits discounted transaction funds into a merchant deposit account. |
| Authentication | In computer security, the process used to verify the identity of a user or the user's eligibility to access an object; verification that a message has not been altered or corrupted; a process used to verify the user of an information system or protected resources. |
| Authorization | In payment card systems, the process used to verify that a credit or debit account is valid and holds sufficient credit or funds to cover a particular payment. Authorization is performed before goods or services are provided or cash access is concluded in order to ensure that the cardholder's credit availability or funds on deposit can support payment. |
| Capture | In payment card systems, the process used by a merchant to claim payment from an issuing financial institution via an acquirer. Capture is performed after goods and services have been provided or delivered. Optionally, capture may be combined with authorization in the case where goods or services are provided at the time of authorization. |
| Cardholder | A person who has a valid payment card account. |
| Charge-back | A name given to the process for a card payment transaction to be returned by a card issuing financial institution to the acquirer for one of several reasons regulated by the interchange card system. |
| Clearing System | An entity or system for routing or interchanging an authorization request for a transaction and the transaction itself to the card issuing financial institution or its agent processor and returning an authorization response to the acquirer or cash advance disbursing bank or its agent processor and effecting funds settlement of the transaction. Such system could be (i) internal to the acquirer (or its processor) for transactions involving other card issuing financial institutions for whom it is a processor, (ii) a card interchange system network such as VISA, MASTERCARD, DISCOVER and others, or (iii) a privately arranged system for an acquirer to route or interchange transactions with card issuing financial institutions. |
| Convenience Card or Use | A revolving credit card account on which a cardholder remits payment for the balance due in full each billing period to not incur a revolving finance charge. |
| Credit Card Cardholder Deposit Account | A deposit account of the credit card cardholder at the credit card issuing financial institution or another depository financial institution. |
| Credit Card Issuing Financial Institution | A government chartered, regulated and licensed depository financial institution that undertakes the issuance of credit cards to consumers and businesses and management of a credit card program. |
| Hold | A process sometimes called a "memo post" whereby a specified amount of funds in a deposit account are withheld from being available to pay checks or other deductions from the account's balance until a transaction occurs which is identified with the instruction to withhold availability of specified funds. |
| Interchange | The process of an acquirer forwarding to a card issuing financial institution card payment transaction data conducted by a card issuing financial institution's cardholders pursuant to rules and regulations of the branded card network or system. |
| Interchange Fee | A fee established and regulated by a branded payment card network or system on a payment card transaction that is paid by the acquirer to the card issuing financial institution for purchase transactions or paid by the card issuing financial institution to the cash disbursing financial institution for cash advance transactions. |
| Interchange Income | Interchange fees received by a card issuing financial institution for card purchase transactions and by a disbursing financial institution for cash advance transactions. |
| Merchant | The equivalent to a physical store where payment cards can be used to pay for goods and services. |
| Open to Buy File | A daily updated data base referenced for granting an approval of an authorization inquiry for a card transaction that contains the account numbers of issued payment cards and the amount of available funds (for debit cards) and unused line of credit (for credit cards) for each listed account less amounts for any pending authorized transactions or transactions that may be in dispute. |
| Payment Card | A credit card or debit card that is issued by a financial institution containing a card system mark(s) and shows a relationship between the cardholder and the card issuing financial institution. |
| Personal Identification Number (PIN Code) | A four-digit number issued to or selected by a cardholder for use as a security feature to identify the cardholder when a payment card is used at an automated teller machine (ATM), other unattended payment terminal, or merchant payment terminal. |
| Repudiated Transaction | A card payment transaction claimed by the cardholder as having not been conducted or authorized by the cardholder. |
| Settlement | The process whereby funds are credited and debited between parties involved in a card payment transaction - usually between financial institutions or their agent processors and the clearing system. |
| Transaction Hold File | A daily updated credit card cardholder's credit card transactions resulting in uniquely identified holds on the cardholder's deposit account that can only be removed by cardholder instruction to remit payment to the credit card account or recredit the cardholder's deposit account in event of a disputed cardholder transaction pursuant to a charge-back. |

There are several major types of financial institution issued payment cards. These are summarized in Table 2 below:

TABLE 2

Payment Card Types

| | |
|---|---|
| Charge Cards | (see Non-revolving Credit Cards). |
| Convenience Use Credit Cards | Revolving credit cards on which cardholders routinely remit payment in full each billing period to not incur a revolving finance charge. |
| Debit Cards | Transactions access funds on deposit for immediate payment and settlement. |
| Non-revolving Credit Cards (aka "Charge Cards") | No extended repayment plan - virtually disappeared in the U.S. market. |
| Prepaid Cards | A form of debit card in which funds are deposited to an account for access by the card only - typically for refunds and gifts as well as pay deposits for "unbanked" and "underbanked" consumers. |
| Revolving Credit Cards | Balance repayment can be extended and paid over time or may be paid in full each billing period as "Convenience" Use Credit Cards. |
| Secured Credit Cards | Revolving credit cards in which the credit line is determined by funds on deposit in either a term savings account or CD or current checking account. The deposit only secures repayment in case of default - developed in the early 1970's by this author to attract savings and loan and other thrift institutions as card issuing members of the Visa system. |

Separate arrangements can be made between the customer cardholder and the card issuing financial institution to have payments of and against outstanding revolving, non-revolving, and secured credit card accounts automatically paid from deposit account funds. Usually these consist of a single monthly debit to the cardholder's deposit account for a fixed amount or a variable full balance payment amount or minimum payment amount on revolving credit card accounts. A majority of revolving credit card account users are "convenience" users (nearly 60 percent) and remit payment (usually via check or online banking instruction) in full each billing period to not incur a finance charge. As non-revolving credit card accounts are extremely rare in the United States, automatic transfer of a single monthly repayment for such accounts is virtually non-existent.

Many consumers in the current economy are being denied credit cards. This is especially true for consumers who are in a 3-5 year Chapter 13 bankruptcy reorganization plan per court order or by the Trustee as repayment is not guaranteed to the credit card issuing financial institution. Even consumers interested in controlling discretionary spending are restricted to a debit card or prepaid card that doesn't really help a consumer to establish, enhance, or re-establish credit with a good repayment record for extended credit.

Financial Institutions interested in helping consumers better control discretionary spending and use of credit only have the debit card option but receive interchange income substantially less than for qualified credit card transactions (from a third to over half less)—thus requiring additional fees on the customer-cardholder. With recent banking reform legislation, such debit card interchange fees are expected to be even more significantly less. Other credit card options are limited in that customer cardholders may be tempted to over spend and over extend—thus defeating the goal of permitting the consumer to gain control over discretionary spending.

SUMMARY

A method is provided for authorizing a financial transaction of a consumer, comprising: in an account establishment phase: issuing a card to a cardholder by a card-issuing financial institution; creating a card account associated with the card and the cardholder; creating a deposit account associated with the cardholder; creating a liability payment remittance account associated with the cardholder; associating the card with the deposit account and the payment remittance account; and placing money in the deposit account; in a transaction authorization phase: receiving a request for authorization for a transaction from a clearing system by the card-issuing financial institution; accessing an open to buy file, using a computer processor, to determine if adequate resources exist to complete the transaction, wherein the open to buy file reflects financial aspects of both the card account and the deposit account; and if adequate resources exist, then: transferring funds from the deposit account to the payment remittance account; and authorizing the purchase transaction; thereby building an outstanding balance on the credit card account; in a payment processing phase, after the predetermined period of time or presentment of the card account balance due: applying a funds debit or charge to the payment remittance account; and crediting the credit card account for an amount of payment.

A further method is provided for authorizing a financial transaction of a consumer, comprising: in an account establishment phase: issuing a card to a cardholder by a card-issuing financial institution; creating a card account associated with the card and the cardholder; creating a deposit account associated with the cardholder; creating a unique identifier for card transaction holds on the cardholder deposit account by way of a separate data store associated with the cardholder; associating the credit card with the deposit account and any transaction hold data store; and placing money in the deposit account; in a transaction authorization phase: receiving a request for authorization for a transaction from a clearing system by the card-issuing financial institution; accessing an open to buy file, using a computer processor, to determine if adequate resources exist to complete the transaction, wherein the open to buy file reflects financial aspects of both the card account and the deposit account; and if adequate resources exist, then: placing a card transaction remittance hold on the deposit account in a cardholder credit card transaction hold data store; and authorizing the purchase transaction; thereby building an outstanding balance on the credit card account; in a payment processing phase, after (a1) the predetermined period of time or (a2) presentment of the credit card account balance due and (b) upon cardholder instruction: applying a funds debit or charge to the deposit account; removing applicable said transaction hold; and crediting the credit card account for an amount of payment.

BRIEF DESCRIPTION OF THE DRAWINGS

Various embodiments of the invention are illustrated in the drawings and described in more detail below.

DETAILED DESCRIPTION

Figure 1:
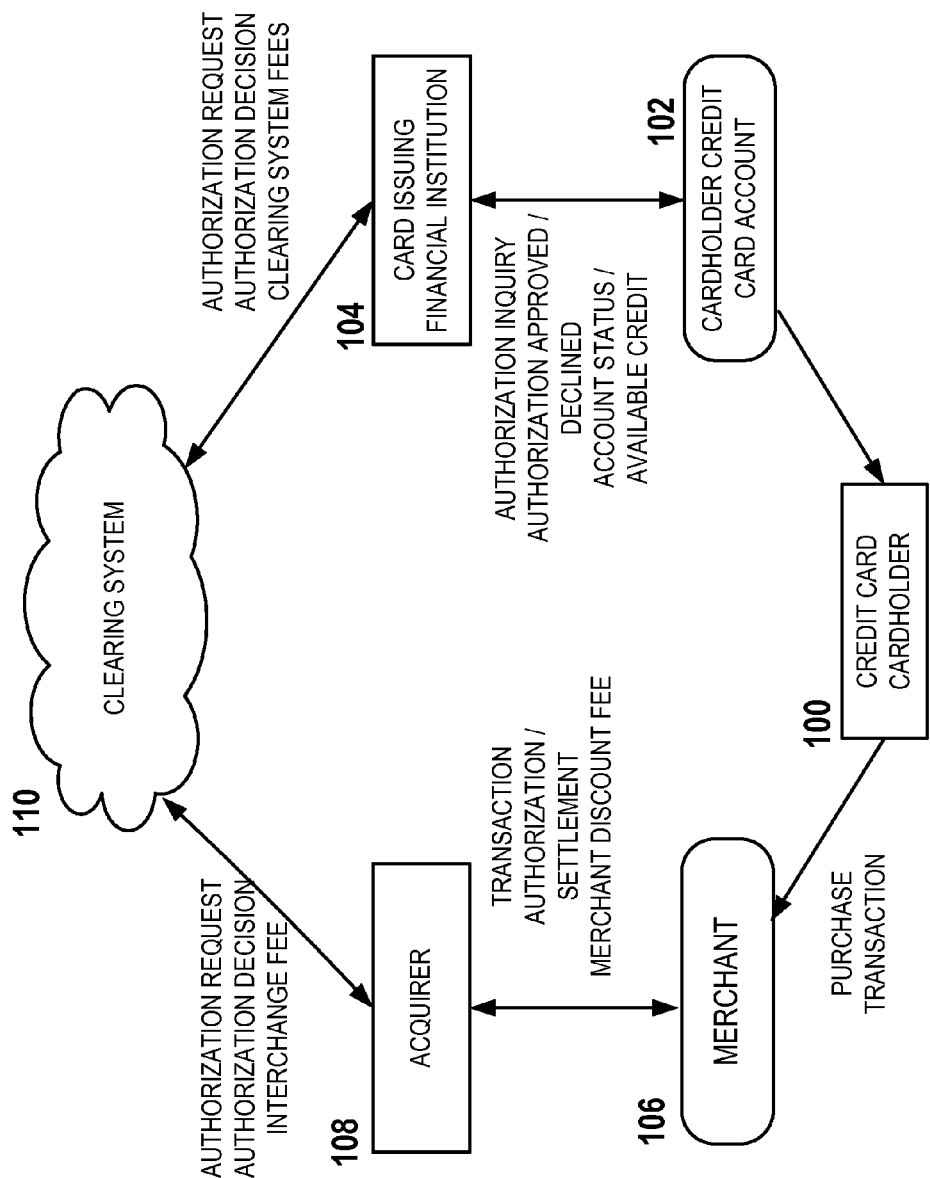
FIG. 1 is a block flow schematic of the processing steps for a standard credit card purchase transaction according to the prior art.

Various embodiments of the invention are provided to create a process for a credit card with revolving credit or without revolving credit (i.e., a "charge card" or based on "convenience" use or a revolving credit card in which: (i) the credit line is dynamically determined by the balance in an associated or designated deposit account of the cardholder, (ii) presentment of a card transaction results in (1) a transfer from the cardholder's deposit account to a liability payment remittance account or similar embodiment of the card issuing financial institution or (2) a uniquely identified "hold" for the transaction amount on the cardholder's deposit account for a set period of time before (iii) funds are transferred automatically from either an internal liability payment remittance account or upon the cardholder's instruction from designated held funds from the cardholder's deposit account at the credit card issuing financial institution to the cardholder's credit card account to repay transactions and balances on a timely or more frequent basis (e.g., ten days after each transaction, the outstanding balance in the account every ten days, or any amount and schedule established by the card issuing financial institution) so that payments are always timely and outstanding balances never revolve. Though a credit card issuer may issue the credit card as a "revolving credit card," it would still function as a "non-revolving" or "convenience" use account excepting for unique credit transactions for a major purchase that can be separately identified and paid with a fixed amount each month over time (ie. living room furniture, major medical expense, automobile repairs, etc.) using the same remittance embodiments contained herein.

It should be noted that the deposit account can just be a normal consumer checking or savings account, or it could be a timed deposit account if the credit card is subject to infrequent use.

The liability payment remittance account serves to operate essentially in the form and serves the same function of a trust account. The remittance account funds are simply applied against the credit card account at some time subsequent to one or more transactions that have been authorized and are pending, based on the process and timing determined by the card issuing institution. Likewise, uniquely identified deposit account hold funds may be kept in a special credit card cardholder transaction hold file and simply applied against the credit card account upon presentment of the credit card amount due and cardholder instruction to remove the designated holds equal to the amount due for remittance as an automatic transfer, a check instrument, or online banking (telephone or Internet) payment instruction.

The system disclosed herein addresses a basic financial need. Consumers need a financial institution issued payment card as a form of universally recognized economic identification in today's world. Consumers with a poor credit rating, consumers with no credit rating, and consumers desiring to build or rebuild their credit rating have limited choices in the payment card world with which to do so.

Credit cards with a revolving credit feature that enables balances to be carried over from month to month with only a small minimum payment against the principal help establish and build credit worthiness if used responsibly. However, if the cardholder yields to temptation and revolves more and more debt, they incur substantial interest charges that can lead to a poor credit rating experience. Studies have shown that over 50 percent of consumers with a revolving credit card account as well as those without a revolving credit card account fear over extending themselves and their ability to repay and properly manage their accounts.

Financial institution issued debit cards offer consumers a safer and more preferential way to "pay as you go" using funds that are on deposit. While responsible usage is positive, it is not as effective in incurring a credit line or balance and a positive repayment history—essential in building and maintaining a positive credit rating.

Non-revolving credit cards or "charge cards" are a compromise between traditional revolving credit cards and debit cards. A credit line is established and responsible usage and timely repayment assures a positive repayment history. However, over spending and late or partial repayments can work against a consumer and establishing a responsible payment history. Moreover, financial institution issued charge cards are virtually non-existent in the United States as financial institutions want consumers to revolve as a way to earn more profitable finance charge income.

The present implementation of the use of the credit card holder deposit account in conjunction with the liability payment remittance account guarantee repayment of the cardholder's credit card account achieves the goal of permitting the consumer to build a positive credit rating, since the consumer is actually incurring true credit liability, but the card issuing institution is also protected by its assurance that deposit account funds exist to support the credit that is extended. Payments on the credit account are guaranteed, if the transaction is authorized. The use of the liability payment remittance account or transaction hold method allows the consumer's credit to build to various levels with ongoing use—and then when timely payments are made against the balance from the deposit account, the credit card financial institution periodically/repetitively reports to credit reporting agencies, such as Experian, TransUnion, and Equifax, that the credit account is "paid as agreed", thereby permitting the consumer to build a positive credit history by such repetitive positive reporting. The card issuing institution can report to the credit reporting agencies the maximum amount of credit extended to the consumer prior to the payment processing that settles the debt incurred by the consumer from the consumer's deposit account. The basic idea is that by not paying off each transaction immediately out of the deposit account, the consumer is permitted to build balances on a non-revolving basis, and then create a "paid as agreed" history, which gets positively reported to the credit reporting agencies.

Various embodiments of the inventive payment card and supporting operating structure and processes enable:

- The consumer cardholder to establish, build, or rebuild a positive credit account payment history;
- The consumer cardholder to use the "charge card" or "convenience" credit card essentially like a debit card, thus avoiding over spending and over extension of credit with spending limited to deposit account available or "open to buy" balances;
- Guaranteed timely payment of transaction balances with collected funds from the consumer cardholder's deposit account tied to the credit card or "charge card";
- The card issuing financial institution to earn credit card interchange fee income rather than substantially lower debit card interchange fee income on a significantly lower cost of operation and cost of funds and thus offer a more reasonable service and periodic account fee to a multiple service line customer;
- The card issuing financial institution to offset such credit card outstanding balances with low cost, collected deposit funds;
- The card issuing financial institution to build both credit card assets with a corresponding growth of liability deposits, thus adding to the institution's asset and liability balance sheet footings; and
- A reduction in the card issuing financial institution's percentage of 30-day and over payment delinquency rates on outstanding credit card balances.

Various embodiments of the invention can be beneficially utilized by:

- Consumers desiring to establish, build, rebuild, or maintain their credit ratings with a credit card that doesn't incur finance charges and functions on a "pay as you go" basis like a debit card;
- Card issuing financial institutions (depository banks, credit unions) and their processors;
- Retirement investment funds, plans, and management firms for fixed income retirees,
- Credit counseling and credit enhancement service agencies.

The system disclosed herein offers a way to enable a card issuing financial institution to issue and efficiently process transactions of a unique, alternative form of secured, non-revolving credit card or "charge card" in which the credit line is dynamically tied to a deposit account of the cardholder. Not only does this deposit account secure the credit line but it also enables timely repayment of transaction balances automatically by immediately accessing collected funds from the cardholder's deposit account with each presentment of a transaction, holding such funds for a period of time to build the outstanding balance of the credit card or "charge card" before subsequently transferring such collected funds to repay accumulated balances.

Repayment transfers can be processed using a myriad of flexible schedule options selected and established by the card issuing financial institution at its discretion that could have repayment more frequently than once per month (e.g., every ten days or every ten days since each transaction was posted to the credit card account). Though classified as a credit card (because it permits the consumer to use true credit), the credit card functions and operates like a debit card (in that a deposit account of the consumer, into which the card issuing financial institution places money received from the consumer, backs the incurred transaction debt and is the immediate source of repayment of each credit card transaction), thus enabling consumers to establish, build, maintain, or rebuild their credit history in a positive way without the fear and temptation of over spending and over extension of credit.

In various alternative embodiments, automatic fund transfers can be replaced by the use of unique "holds" on accounts. This can be used in situations where compulsory automatic electronic funds transfers might encounter regulatory difficulties. A Federal Reserve Board (FRB) Staff Interpretation of FRB Regulation E (Reg. E) prohibits sole compulsory automatic electronic funds transfers from deposit accounts to repay loans, but do permit automatic electronic funds transfers as part of different options that may be selected by a consumer for making remittance payments.

Consumers alternatively may choose to initiate their own payment either via a check, telephone or Internet transfer order, or preauthorized electronic funds transfer directly from their deposit account, thus avoiding the prohibition on compulsory transfer requirement complying with Reg. E.

However, it is also possible to make use of transaction "holds" on the deposit account. Such holds could remain for several days—even weeks—under a separate agreement between the bank and the consumer. Such holds can be uniquely identified and/or classed so that timely remittance via telephone and Internet initiated orders as well as automatic preauthorized electronic funds transfers to pay the charge card balance would be made pursuant to those applicable deposit account holds much in the same manner as the previous embodiment.

This latter concept using holds concerns (1) identifying or classifying each credit card transaction related hold to the deposit account within a group or separate file to the deposit account apart from other deposit account transaction or administrative holds and (2) enabling such holds to only being removed or formally posted by the account holder's authorization to repay a debt obligation (whether for a charge card, credit card, or other debt obligation such a home equity credit line) excepting the issuing financial institution's action to initiate payment in the event of the account holder's failure to initiate and authorize payment on a timely basis. Essentially, the account holder initiates the payment or preauthorization instruction and hold removal, and not the bank, except for those occasions in which the accountholder fails to remit payment on time.

The remittance account can include options that the bank could offer to their consumers, and there could be two or three variations on kinds of accounts that consumers could use. This implies that the transfer would not be compulsory because the consumer's choice to use one or the other might be more advantageous from a pricing standpoint or result in building a better credit history on one variation versus another. As long as the consumer has a choice, the automatic transfer is not compulsory, since the compulsory requirement is that in order to get the account, the consumer must agree to the electronic transfer. Here, the consumer is also offered an option that says they can operate differently, e.g., can order the release of the hold by an Internet instruction to transfer or to instruct the bank to keep the hold (where the consumer is the one that places the hold release in order to make the remittance, i.e., the consumer is deliberately making the instruction rather than an automated electronic transfer taking place).

For example, if the consumer selects use of the liability remittance account option, the consumer might only have to pay a dollar a month for that service, but the consumer actually winds up building their credit to a much larger extent, so there's a material benefit that goes to the consumer when they select that option.

A traditional hold on an account is where a consumer has made a check deposit into their account, but they are waiting on the check to clear. This puts a hold on the account, meaning that the consumer cannot access the deposited funds until the funds for the check are collected.

When an automated clearing house transaction comes in that supposed to debit a consumer's account, a hold is placed on the account until the transaction is actually presented. When it's presented, the hold is removed. This is frequently done with debit card transactions. The authorization comes in, a hold is put on the consumer's deposit account until the transaction is presented, and then the hold is removed. The hold means that the funds are unavailable for other uses.

For the hold, as described herein, the account holder instructs the bank to put the hold on the account (which is the opposite of traditional holds). This is a part of the service that the bank is offering, but it comes about as a result of the account holder's action. The holds are uniquely identified, and they are held in a central file. Only upon account holder instruction does the hold get removed (not bank instruction). The fact that the account holder removes the hold on the account that makes this solution unique.

The account holder instruction can come in the form of a telephone instruction, an electronic instruction over the Internet, or it can come in the form of a preauthorized instruction so that the hold can be removed and the money can be used to pay the charge card account—in any case, it always results from an account holder instruction.

The bank has the hold on the account based on the consumer's instruction that essentially tells the institution that when a credit card or a charge card transaction comes in and the institution is advised of it, the institution is authorized to hold the funds out of the consumer's deposit account for subsequent payment of that transaction as it would be for other credit card transactions or release it if the transaction is to be disputed by the credit card cardholder and charged back. In this embodiment, it is up to the consumer to proactively initiate the transaction that removes the hold so the charge card account can be paid. This clearly avoids any compulsory transfer prohibition, since the consumer now has the option to make the payment or order the payment to be made. Rather than the funds being held once the transaction is presented, funds are withdrawn, and then the transactions uniquely identified as a credit card transaction hold within the deposit account or put into a separate transaction hold file or similar embodiment. In this particular case, the funds are held and then it's up to the account holder to initiate the necessary instruction for the hold to be removed and the funds to be transferred for the payment of the account. In the one embodiment, it is automatic, and in the other embodiment, it is a conscious cardholder instruction for payment. Such payment remittances would occur on or before the due date, but after the monthly statement has been issued to the cardholder for verification of the charges.

In many situations, the consumer would likely opt for an automatic transfer, because the consumer does not want the additional burden/overhead of releasing the holds—this is especially true if they get a better rate.

For a consumer who is a poor money manager, if the consumer fails to make the payment on the due date, the consumer can authorized the bank to debit the consumer's deposit account for the money. The consumer's deposit account can have an associated instruction that the institution should release such holds so that they can get paid. Thus, if the consumer neglects to remove such holds, the consumer is not penalized and the bank automatically removes the holds for the consumer.

Thus, the bank holds earmarked funds that are available for later remittance to pay an account (i.e., holding the funds in reserve). Thus, the remittance trust account and use of holds within the cardholder's deposit account are alternate ways of doing things. In each case, they deal with funds that are already committed for another use.

As noted previously, the purpose of these accounts is to help people rebuild their credit and have a positive payment history where they are never late but always on time. It is important for the bank to know that it is going to get paid, and it knows this because there is a hold on the account and the cardholder has given the bank an instruction that if the payment is not received, the bank can automatically debit the account and make sure it's paid timely It should be noted that the authorization, clearing and settlement processes are implemented electronically and utilize computers having processors running software algorithms that perform the accounting functions defined below.

Various embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The system described below relates to a standard payment transaction system through the use of a credit card issued by a licensed financial institution (herein referred to as a "standard credit card transaction"). FIGS. 1 through 4 contain schematics of a standard credit card transaction of the prior art depicting a purchase transaction, cash advance transaction, transaction authorization process, and transaction presentment and settlement process among participants in the financial institution credit card system, and are provided as an environmental overview within which the card issuing financial institution operates.

FIGS. 5 through 10 contain schematics within the card issuing financial institution or its agent processor(s) depicting transaction authorization processes, transaction presentment and accounts postings processes, and payment remittance processes of prior art and embodiments of the invention. The invention mimics the current standard so as to be transparent within the transaction environment to all participating entities as depicted in FIGS. 1 through 4 with various embodiments of the invention occurring within the card issuing financial institution 104 or its agent processor.

FIG. 1 is a schematic of a standard credit card transaction of the prior art depicting a purchase transaction occurring between a merchant 106 and a cardholder 100. Transactions using the credit card can be conducted in situations where the cardholder and credit card are present during the transactions (face-to-face transactions), in situations where the cardholder and payment card are not present (e.g., telephone order, mail order, internet transactions or mobile telephone transactions), and in situations where the cardholder has authorized periodically recurring charges to be posted against his credit card account 102 or private label line of credit. Also, the term "credit card" is used broadly to denote a form of identification of an account or accounts that may be independent of a physical card.

To make a purchase from the merchant 106, the cardholder 100 presents a credit card to the merchant 106 for payment of goods and/or services. The merchant 106 either makes an imprint of the credit card or otherwise gathers the identification number and other information from the card. The merchant 106 then seeks authorization for the transaction and then settlement of the transaction from the merchant's acquirer 108 (a processor agent of a licensed financial institution or the financial institution itself). In some cases this acquiring financial institution 108 may also be the card issuing financial institution 104.

The merchant 106 obtains authorization from the acquirer 108 by communicating the information about the transaction to the acquirer 108 including the credit card number and other information obtained from the card along with the amount of the transaction. The acquirer 108 communicates the credit card number and other information obtained from the card along with the transaction amount through a clearing system 110 for approval and settlement. The acquirer 108 receives a merchant discount fee for the services from the merchant 106.

The clearing system 110 may be internal to the acquirer 108 (or its processor) for transactions involving other card issuing financial institutions 104 for whom it is a processor, a card interchange system network, such as VISA, MASTERCARD, DISCOVER and others, or a privately arranged system for interchanging transactions with card issuing financial institutions 104.

The clearing system 110 communicates the card number and other information obtained from the card along with the transaction amount to a card issuing financial institution 104, seeking approval and settlement. The clearing system 110 receives financial benefits from the acquirer 108 and pays fees to the card issuing financial institution 104 as compensation for facilitating the transaction. These fee structures are predetermined by the branded card networks like VISA, MASTERCARD, or DISCOVER and other such network systems.

The card issuing financial institution 104 issued the credit card and a credit card account 102 in conjunction with, or accessed by, the credit card. The card issuing financial institution 104 or its agent processor compares the amount of the purchase with a current balance and a credit limit of the credit card account 102 associated with the credit card number communicated from the clearing system 110. The card issuing financial institution 104 approves the transaction if there is sufficient credit remaining or may deny the transaction if the credit limit has been exceeded or for some other credit limiting reason (e.g., overdue payment on account). If approved, the card issuing financial institution 104 places a "hold" or reserve in the authorized amount on the credit card account 102 remaining unused credit limit balance awaiting final clearing and presentment of the transaction to the card issuing financial institution 104.

Upon presentment, the transaction amount is deducted from the credit card account 102 of the cardholder adding to the account's balance due while the acquirer 108 credits the amount to an account of the merchant 106. The card issuing financial institution 104 tallies the amount of all transactions for a particular period and submits a statement to the cardholder for payment on the credit card account 102. The acquirer 108 tallies discount fees and processing fees, submits a statement to the merchant 106 for a particular period and deducts the discounts and fees from the account of the merchant.

Figure 2:
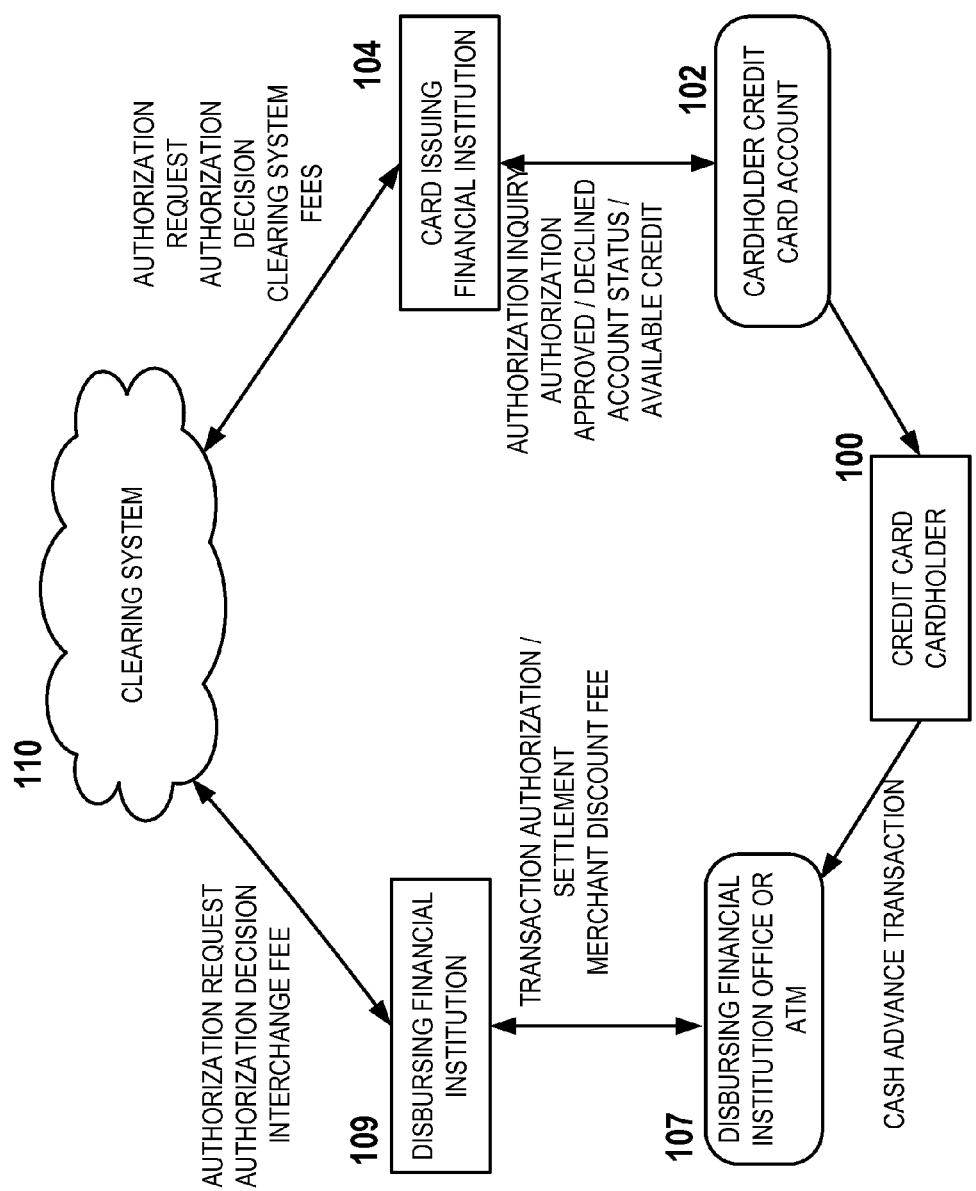
FIG. 2 is a block flow schematic of the processing steps for a standard credit card cash advance transaction according to the prior art.

FIG. 2 is a schematic of a standard credit card transaction of the prior art depicting a cash advance transaction occurring between a participating disbursing financial institution/ATM 107 and a cardholder 100. Such a transaction may be made via an "over-the-counter" presentment of the card or via an automated teller machine (ATM). To obtain a cash advance from a disbursing financial institution/ATM 107, the cardholder 100 presents a credit card to the disbursing financial institution/ATM for cash. The disbursing financial institution/ATM 107 either makes an imprint of the credit card if presented over the counter or otherwise gathers the identification number and other information from the card along with the personal identification number (PIN) of the cardholder.

The disbursing financial institution/ATM 107 then seeks authorization for the transaction and settlement for the transaction from the disbursing financial institution/ATM 109 or its processor. In some cases this disbursing financial institution 109 may also be the card issuing financial institution 104. The disbursing financial institution/ATM 107 obtains authorization by communicating the information about the transaction including the credit card number, card expiration date, cardholder PIN (if an ATM is used), and other card information along with the transaction amount to the disbursing financial institution 109 its processor or through a clearing system 110 for approval and settlement. The disbursing financial institution 109 may charge a fee to the cardholder 100, but also receives a fee when the transaction is interchanged through the clearing system 110 from the card issuing financial institution 104.

The clearing system 110 may be internal to the processor of the disbursing financial institution 109 for transactions involving other card issuing financial institutions 104 for whom it is a processor, a card interchange system network such as VISA, MASTERCARD, DISCOVER, and others, or a privately arranged system for interchanging transactions with card issuing financial institutions 104. The clearing system 110 communicates the card number, expiration date, PIN (as applicable), and other card information along with the transaction amount to a card issuing financial institution 104, seeking approval and settlement. The clearing system 110 receives financial benefits from the card issuing financial institution 104 as compensation for facilitating the transaction and pays the fee to the disbursing financial institution 107. These fee structures are predetermined by the branded card networks like VISA, MASTERCARD, and DISCOVER, and other such network systems.

The card issuing financial institution 104 issued the credit card and a credit card account 102 in conjunction with, or accessed by, the credit card. The card issuing financial institution 104, or its agent processor, compares the amount of the cash advance transaction with a current balance and a credit limit of the credit card account 102 associated with the credit card number communicated from the clearing system 110. The card issuing financial institution 104 approves the transaction if there is sufficient credit remaining in the cardholder's credit card account, or may deny the transaction if the credit limit has been exceeded or for some other credit limiting reason (e.g., overdue payment on account). If approved, the card issuing financial institution 104 places a "hold" or reserve in the authorized amount on the credit card account 102 remaining unused credit limit balance awaiting final clearing and presentment of the transaction to the card issuing financial institution 104.

Upon presentment, the transaction amount is deducted from the cardholder's credit card account 102 adding to the account's balance due, while the disbursing financial institution 109 credits the amount to an account of the disbursing financial institution 107. The card issuing financial institution 104 tallies the amount of all transactions for a particular period and submits a statement to the cardholder for payment on the credit card account 102.

Figure 3:
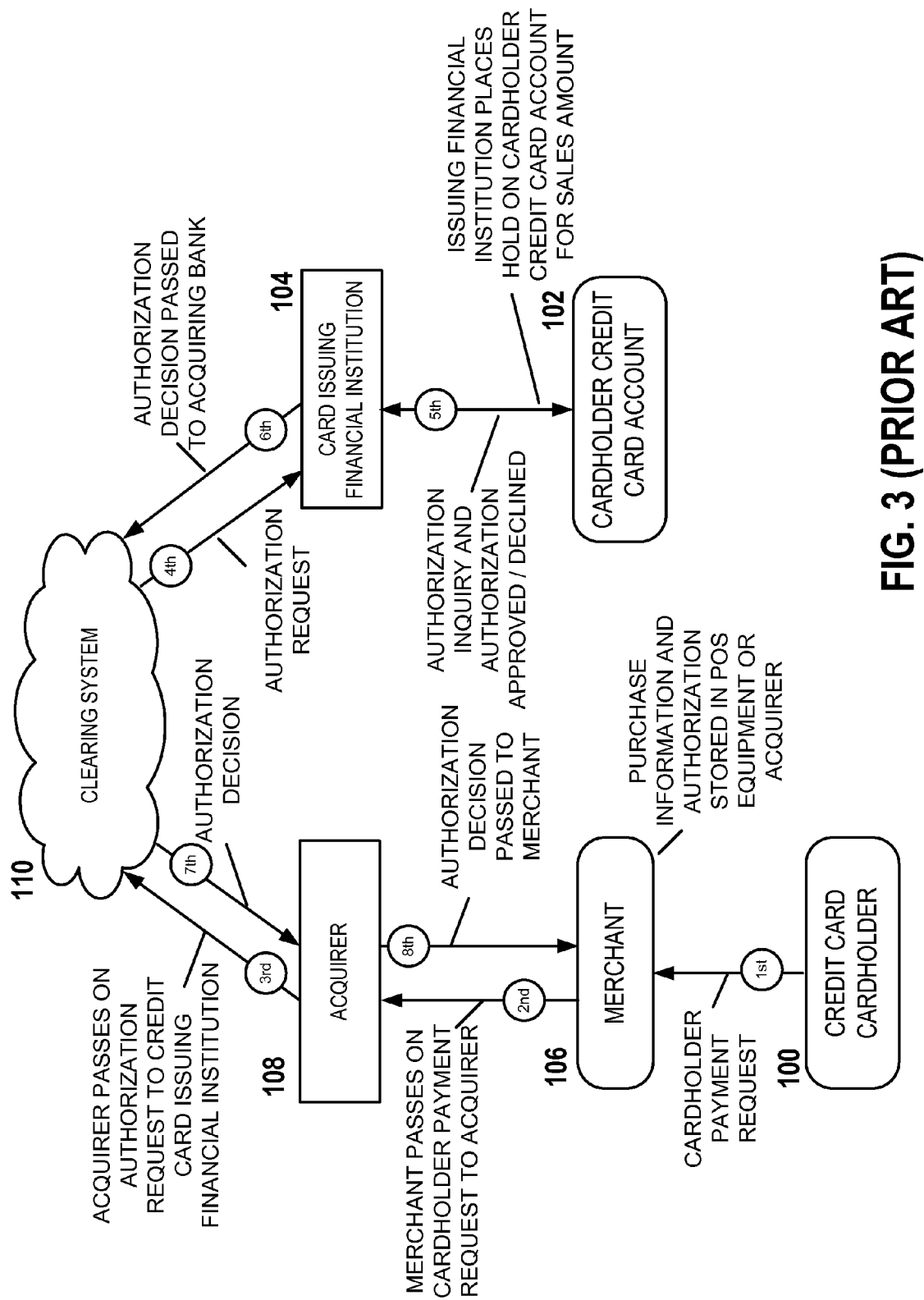
FIG. 3 is a block flow schematic of the purchase transaction authorization process among participants in the financial institution-based credit card network system according to the prior art.

FIG. 3 is a schematic depicting the current standard for a purchase transaction authorization process among participants in the financial institution credit card system. As provided in the schematic, the process steps are:

Step 1. The credit card cardholder 100 purchases goods or services from a merchant 106 using a credit card from a card issuing financial institution 104.

Step 2. The merchant 106 captures the card and transaction information and passes it on (electronically) to its acquirer 108 (independent processing agent for an acquiring financial institution, the financial institution itself, or a processing agent or association) requesting that the card be validated and the transaction be authorized.

Step 3. The acquirer 108 electronically routes the authorization request to the clearing system 110 for authorization from the card issuing financial institution 104 or its processor agent.

Step 4. The card issuing financial institution 104 validates the card and available funds in the cardholder's credit card account 102 and either approves the transaction or declines it via a return message to the clearing system 110.

Step 5. The card issuing financial institution 104 enters a memo post or hold for the amount of the transaction against the cardholder's credit card account 102 to await final transaction presentment.

Step 6. The card issuing financial institution 104 returns its approval or decline decision to the clearing system 110 for routing back to the acquirer 108.

Step 7. The acquirer 108 receives the decision response from the clearing system 110.

Step 8. The acquirer 108 routes the decision response to the merchant 106 along with an authorization code that will be included on the transaction when submitted for payment settlement.

Figure 4:
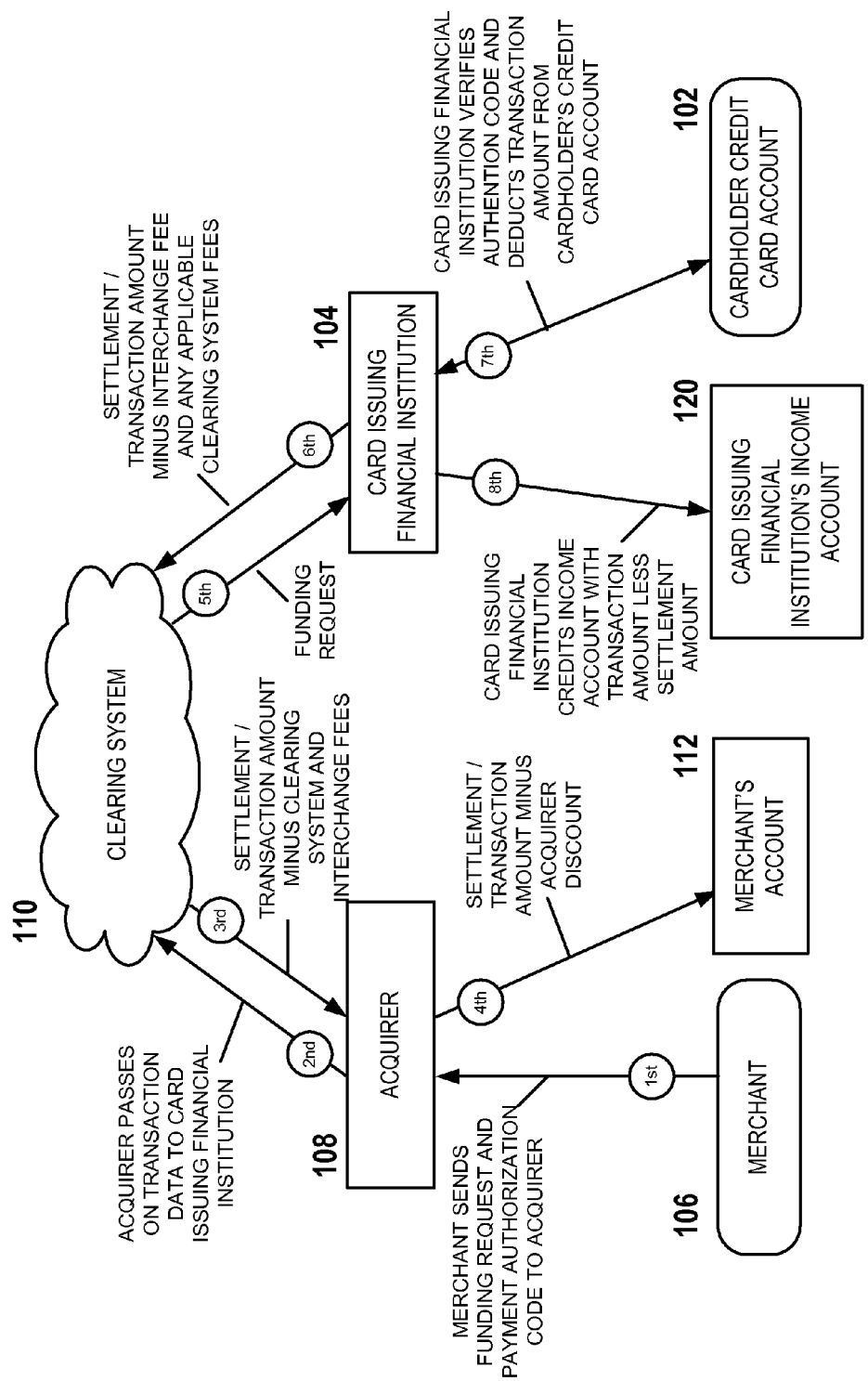
FIG. 4 is a block flow schematic of the purchase transaction presentment and settlement process among participants in the financial institution-based credit card network according to the prior art.

FIG. 4 is a schematic depicting the current standard for a purchase transaction presentment and settlement process among participants in the financial institution credit card system. As provided in the schematic, the process steps are:

Step 1. The merchant 106 submits an authorized completed credit card transaction to its acquirer 108.

Step 2. The acquirer 108 submits the transaction to the clearing system 110 for presentment to the card issuing financial institution 104.

Step 3. The clearing system 110 financially settles the transaction with the acquirer 108 in an amount equal to the transaction amount minus the appropriate card system interchange and process clearing fees.

Step 4. The acquirer 104 settles the transaction with the merchant 106 by crediting the merchant's deposit account 112 at the merchant's own financial institution in an amount equal to the transaction amount minus the acquirer discount amount. Other acquirer fees are separately billed and charged to the merchant.

Step 5. The clearing system 110 routes the transaction to the cardholder's credit card issuing financial institution 104 or its agent processor.

Step 6. The cardholder's credit card issuing financial institution 104 financially settles with the clearing system 110 for an amount equal to the amount of the transaction less the applicable card system interchange fee and other card system clearing process fees.

Step 7. The credit card issuing financial institution 104 posts (charges) the full amount of the transaction to the cardholder's credit card account 102, thus removing any hold on the available funds.

Step 8. The credit card issuing financial institution 104 credits its income account 120 or similar embodiment with the amount of the interchange fee (full transaction amount minus the transaction settlement amount).

Various embodiments of the invention address the prior art aspects for a: (i) transaction authorization request, (ii) transaction presentment and accounts postings, and (iii) credit card cardholder payment of account balance due within the card issuing financial institution 104 or its agent processor.

Figure 5:
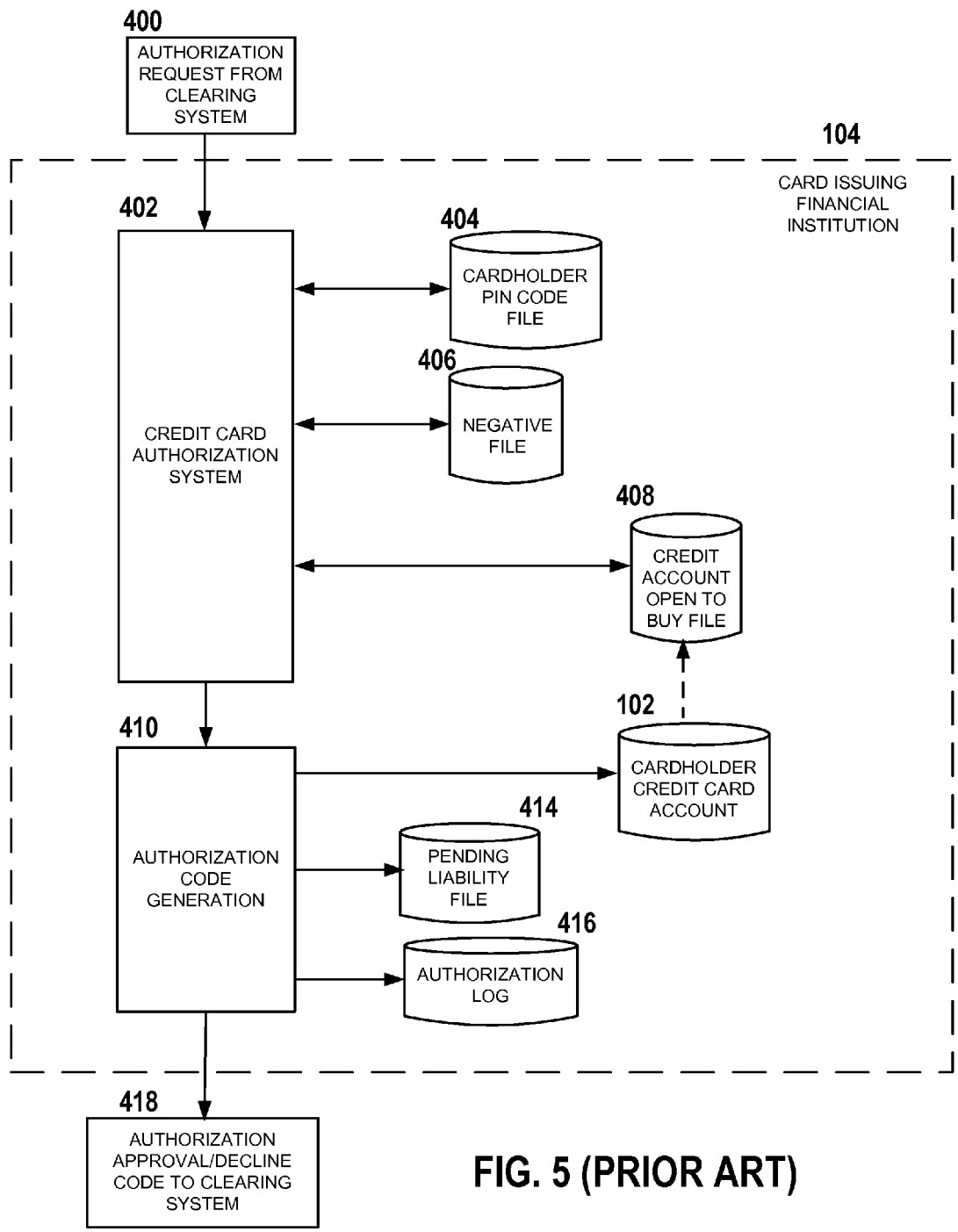
FIG. 5 is a block flow schematic of the card issuing financial institution's internal credit card transaction authorization process according to the prior art.

FIG. 5 is a schematic showing the prior art of the card issuing financial institution's internal transaction authorization process for a credit card transaction whether for a purchase or cash advance. A transaction authorization request (or inquiry) 400 is received by the credit card authorization system 402 from the clearing system. The request 400 contains the credit card account number, card expiration date, transaction amount, transaction type (i.e., purchase, cash advance), and other information pertinent to regulation and the process.

A cash advance transaction conducted at an automated teller machine (ATM) and possibly another purchase transaction conducted at an attended and unattended merchant terminal may include the cardholder entry of a personal identification number (PIN) which would be encrypted and then included within the authorization request 400.

The credit card authorization system 400 verifies the validity of the card expiration date and the card number against a negative file 406. If the credit card account number appears on the negative file 406 or the expiration date is invalid, the transaction authorization is declined via the authorization generation process 410 with a decline code 418, stating the reason for the decline, and may result in a demand for the credit card to be retained and/or other such action to be taken.

If the transaction authorization inquiry has a PIN, the credit card authorization system 402 validates the PIN via decryption or other processes including verification to the cardholder PIN code file 404. If the PIN cannot be validated, the transaction inquiry is declined via the authorization generation process 410 with a code stating the reason for the decline. An inquiry is also made of the open to buy file 408 or similar embodiment to determine if sufficient credit remains on the credit card cardholder's account.

The open to buy file 408 is updated at least daily from the credit card cardholder account file 102 and reflects a net balance less authorization amount inquiries for which completed transactions have not been presented, cardholder payments on the credit card account, charge-back credits, miscellaneous fees and other such embodiments. If there is not a sufficient open to buy, the transaction authorization request is declined.

The credit card authorization system 402 proceeds to authorization code generation 410 and generates either an approval code or decline code and returns the authorization approval or declination to the clearing system 418. An authorization code is generated for an approved transaction and included in the response to the clearing system 418. Regardless of whether the transaction authorization is approved or declined, the authorization log 416 is updated. The cardholder credit card account file 102 is also updated. An approved transaction authorization results in an update from the cardholder credit card account file 102 to the open to buy file 408 or similar embodiment. A pending liability file 414 or similar embodiment is also updated for an approved transaction authorization awaiting presentment of the transaction.

Figure 6A:
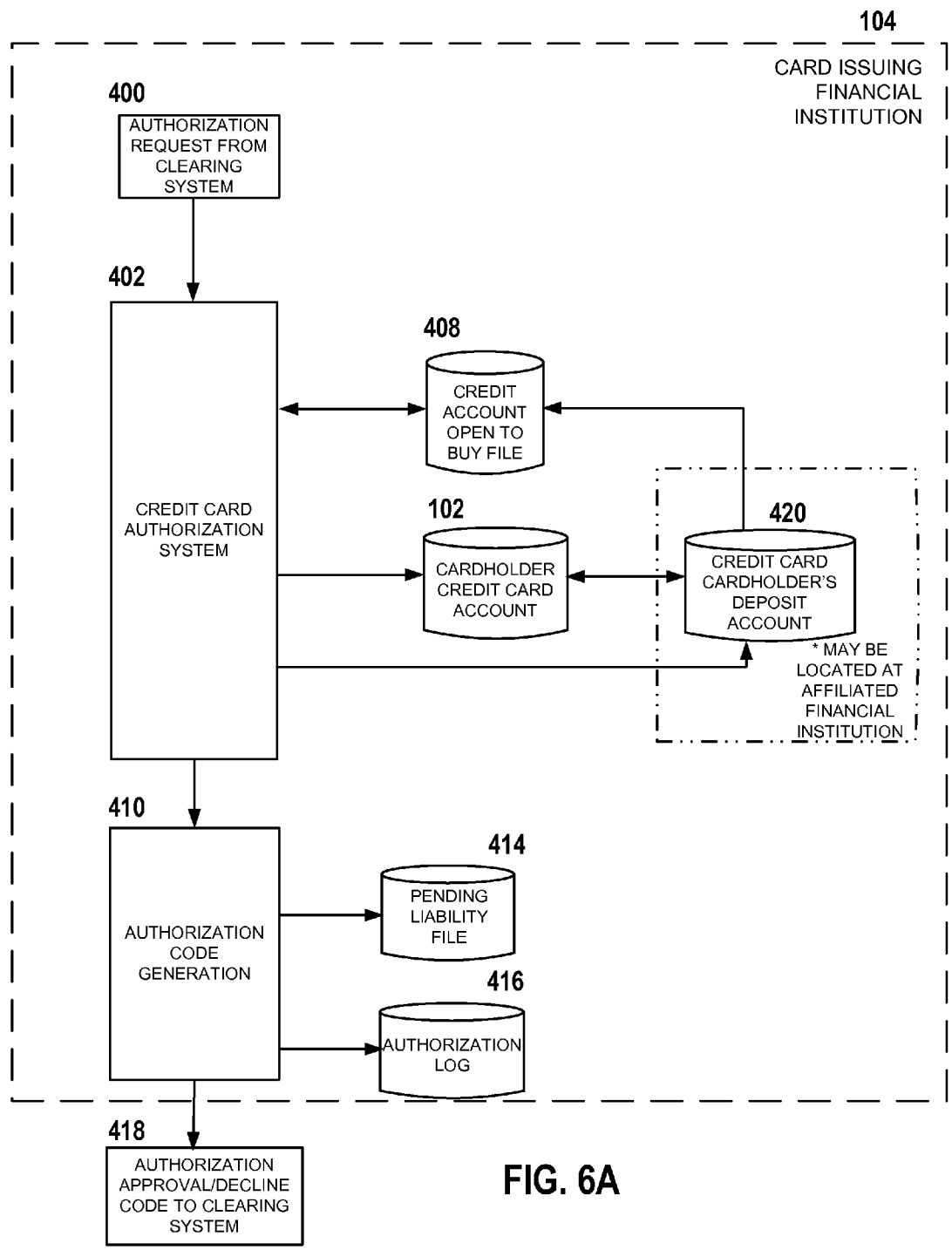
FIG. 6A is a block flow schematic of the card issuing financial institution's internal credit card transaction authorization process according to an embodiment of the invention.

FIG. 6A is a schematic block flow diagram that shows how an embodiment of the invention enables the card issuing financial institution's internal credit card transaction authorization process involving transactions conducted with the credit card or "charge card" tied to the credit card cardholder's deposit account with the invention modifications. Added to the authorization function is the credit cardholder deposit account 420 or similar embodiment. Such deposit account may be an account of the credit card issuing financial institution or that of another depository financial institution.

The credit card account file 102 is updated by the credit card cardholder deposit account 420 on a frequent basis (at least daily) to determine the credit card cardholder's available credit limit from which the open to buy file 408 or similar embodiment can be updated either from the credit card cardholder account file 102 or directly from the deposit account file 420 or similar embodiment.

When a transaction authorization request 400 is approved, the authorization code generation 410 updates both the credit card cardholder account file 102 that in turn updates the credit card cardholder deposit account 420 resulting in a hold, memo post, or similar embodiment on the credit card cardholder deposit account 420 in the amount of the transaction. Alternatively, the update can be made separately to both the credit card account file 102 and the credit card cardholder deposit account file 420 or similar embodiment.

Figure 6B:
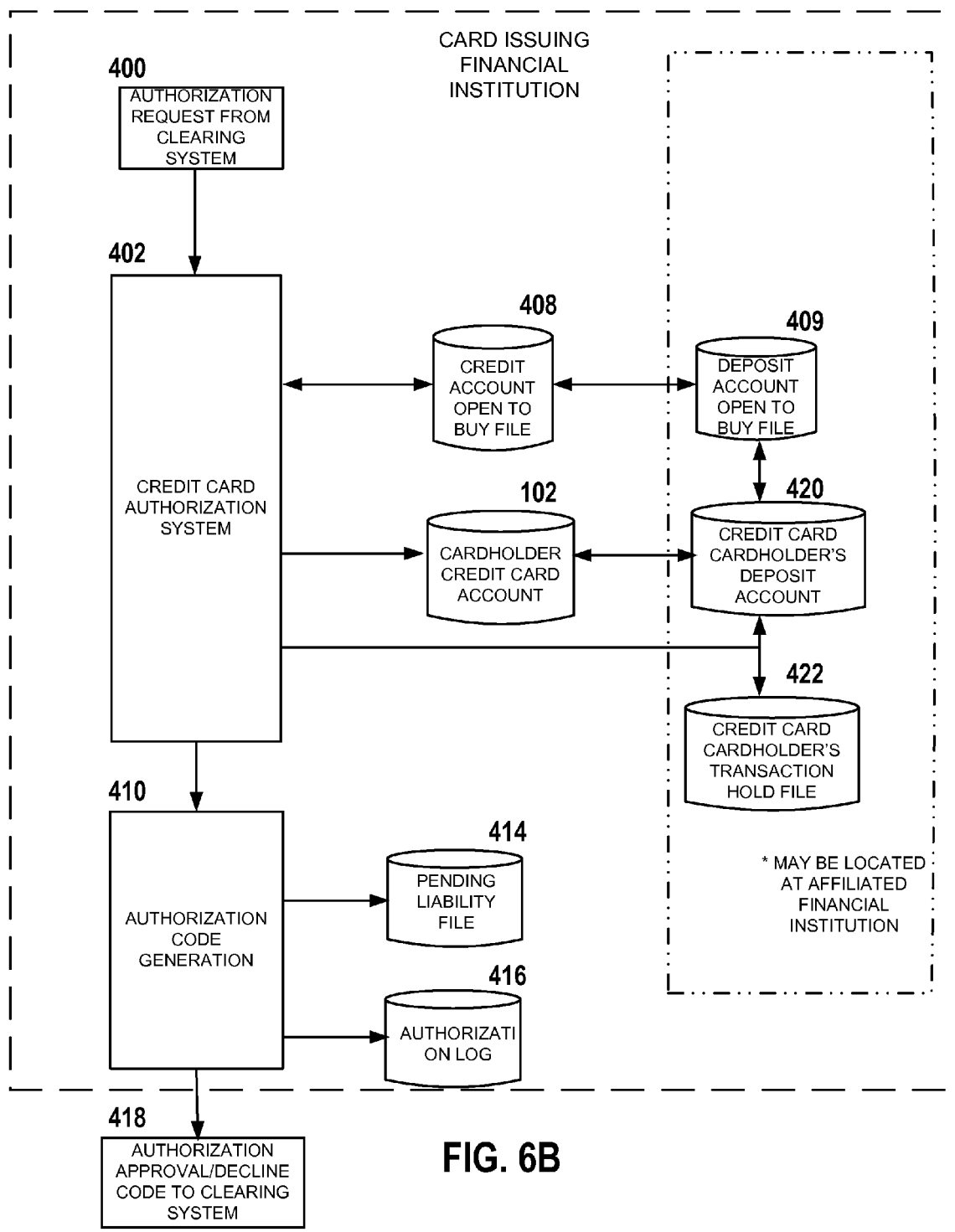
FIG. 6B is a block flow schematic of the card issuing financial institution's internal credit card transaction authorization process according to another embodiment of the invention.

FIG. 6B is a schematic block flow that shows an alternate embodiment for the card issuing financial institution's internal credit card transaction authorization process involving transactions conducted with the credit card or "charge card" tied to the credit card cardholder's deposit account. When a transaction authorization request 400 is approved by the Credit Card Authorization System 402, the credit card cardholder account file 102 is updated and that in turn updates the credit card cardholder deposit account 420 resulting in a hold, memo post, or similar embodiment in the amount of the transaction. Such a hold or memo post is uniquely identified from other deposit account transactions, deposits or administrative holds, memo posts or similar embodiments as a charge card transaction hold, memo post, or similar embodiment, and included within a separately designated "Credit Card Cardholder's Transaction Hold File" 422. In contrast to the embodiment shown in FIG. 6A, a deposit account open to buy file 409 is located between the credit card cardholder's deposit account 420 and the credit account open to buy file 408.

Figure 7:
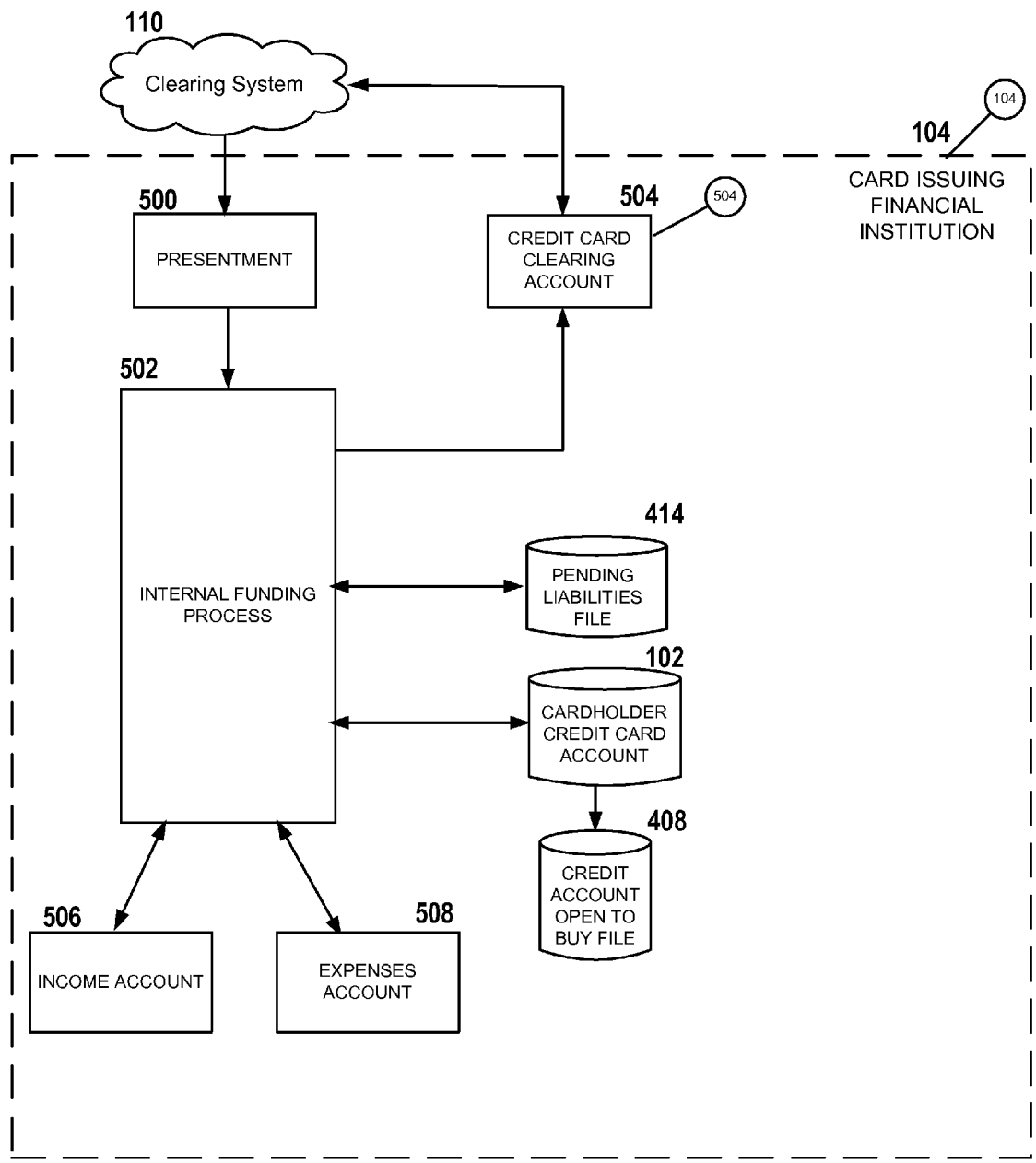
FIG. 7 is a block flow schematic of the card issuing financial institution's internal credit card transaction presentment and accounts postings process according to the prior art.

FIG. 7 is a schematic of the prior art for the card issuing financial institution's internal credit card transaction presentment and accounts postings within the card issuing financial institution or agent processor. The schematic omits a number of ancillary monitoring, verification, and screening processes for possible charge-back action, suspect fraud attention and other activities as the invention only impacts the transaction presentment, settlement and account posting functions.

A credit card transaction is received with a batch of other like transactions by the card issuing financial institution 500. Transactions are identified with the credit card account number, transaction date, transaction amount, authorization number, transaction reference number, merchant or disbursing bank identification, and other relevant data in accordance with ISO and other clearing system standards. Presentment 500 is settled between the clearing system and the card issuing financial institution 104 by a debit (charge) to the card issuing financial institution's credit card clearing account 504 or similar embodiment for the amount of the transaction less the applicable interchange fee for a purchase transaction and the amount of the transaction plus the applicable interchange for a cash advance transaction (that amount paid to the disbursing financial institution through the clearing system).

For a purchase transaction, the internal funding function 502 updates the pending liabilities file for the full amount of the transaction, and performs: (i) a funds debit (charge) to the credit card cardholder account 102 in the full amount of the transaction from which the open to buy file 408 or similar embodiment is updated 102, (ii) a funds credit to the credit card issuing financial institution's card clearing account 504 or similar embodiment for the amount of the transaction less the applicable interchange fee, and (iii) a funds credit to the issuing financial institution's credit card interchange income account 506 or similar embodiment for the amount of the applicable purchase transaction interchange fee or other fees.

For a cash advance transaction, the internal funding function 502 updates the pending liabilities file 414 for the full amount of the transaction, and performs: (i) a funds debit (charge) to the credit card cardholder account 102 for the full amount of the transaction and a separate funds debit (charge) to the credit card cardholder account 102 for any applicable issuing financial institution credit card account agreement fee for a cash advance transaction or ATM transaction from which the open to buy file 408 is updated 102, (ii) a funds credit to the issuing financial institution's card clearing account 504 for the full amount of the transaction plus the amount of the applicable cash advance interchange fee, (iii) a funds credit to the issuing financial institution's credit card income account 506 or similar embodiment for an applicable cash advance and/or ATM fees that was debited (charged) to the cardholder's credit card account 102, and (iv) a funds debit charge to either the issuing financial institution's credit card interchange and other expenses accounts 508 or similar embodiments or to the issuing financial institution's credit card income account or similar embodiment.

Figure 8A:
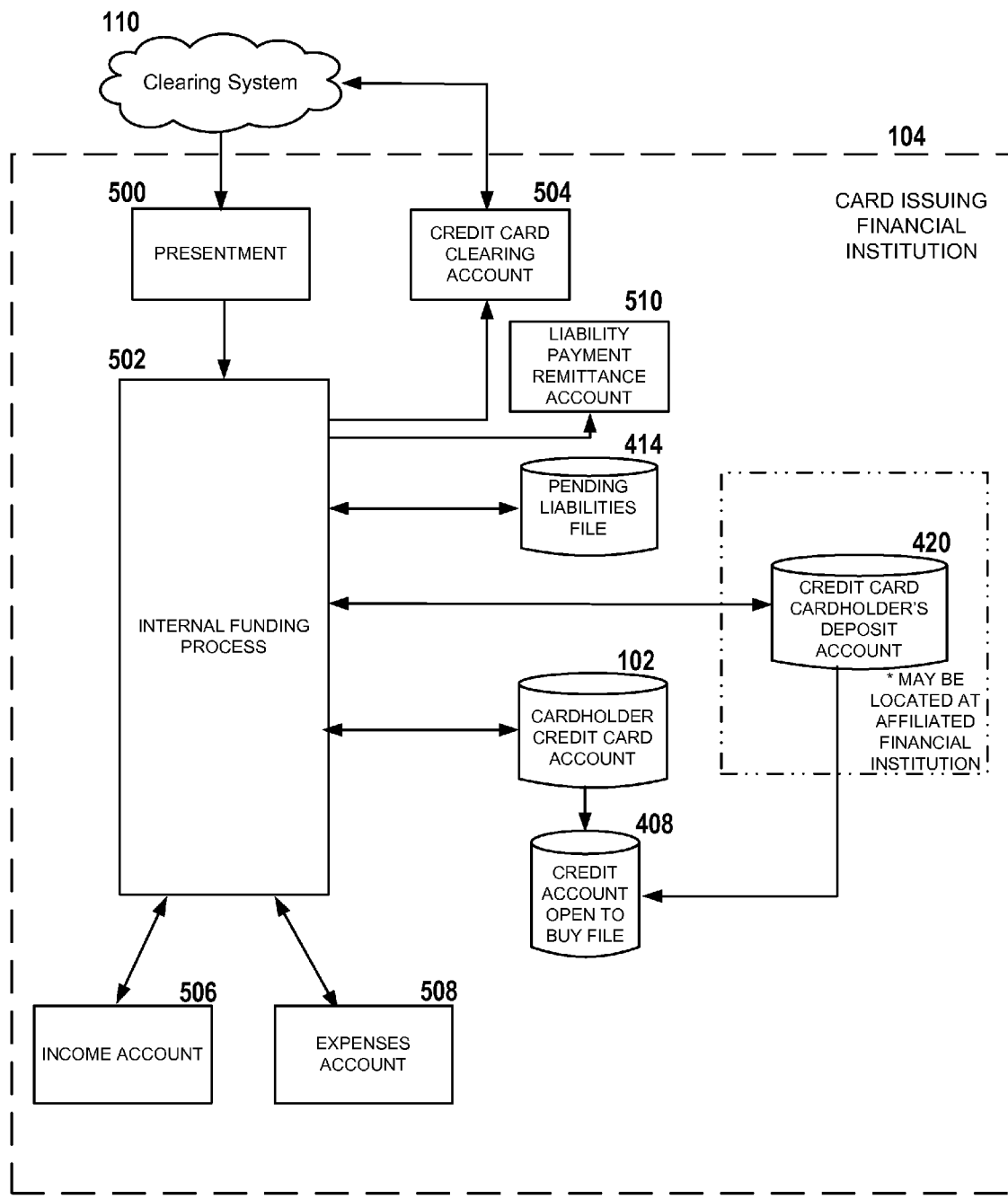
FIG. 8A is a block flow schematic of the card issuing financial institution's internal credit card transaction presentment and accounts postings process according to an embodiment of the invention.

FIG. 8A is a schematic that shows the improvements to the card issuing financial institution's internal transaction presentment and accounts postings processes. In addition to performing the previously described functions shown in FIG. 7, the internal funding process 502 also performs the following.

First, it performs a funds debit (charge) to the credit card cardholder's deposit account 420 or similar embodiment for the full amount of the transaction, thus removing the hold or otherwise fulfilling the memo post to the account from the transaction authorization process, plus a separate funds debit (charge) to the credit card cardholder's deposit account 420 for any miscellaneous fees for cash access, ATM use, or other such fees whether for a purchase, cash advance or other kinds of transaction embodiments in accordance with its agreement with the cardholder.

Second, it performs a funds credit in the full amount of the transaction to a liability payment remittance account 510 or similar embodiment of the issuing financial institution to be held in trust for an established period of time before being debited (charged) to pay for the transaction or outstanding balance in the cardholder's credit card account.

Third, it performs a funds credit to the cardholder's credit card account 102 for any applicable cash advance fee, ATM use fee, or other such fees whether for a purchase, cash advance or other kinds of transaction embodiments from which applicable prior art debits (charges) to the credit card account for crediting and debiting the issuing financial institution's income and expense accounts.

Figure 8B:
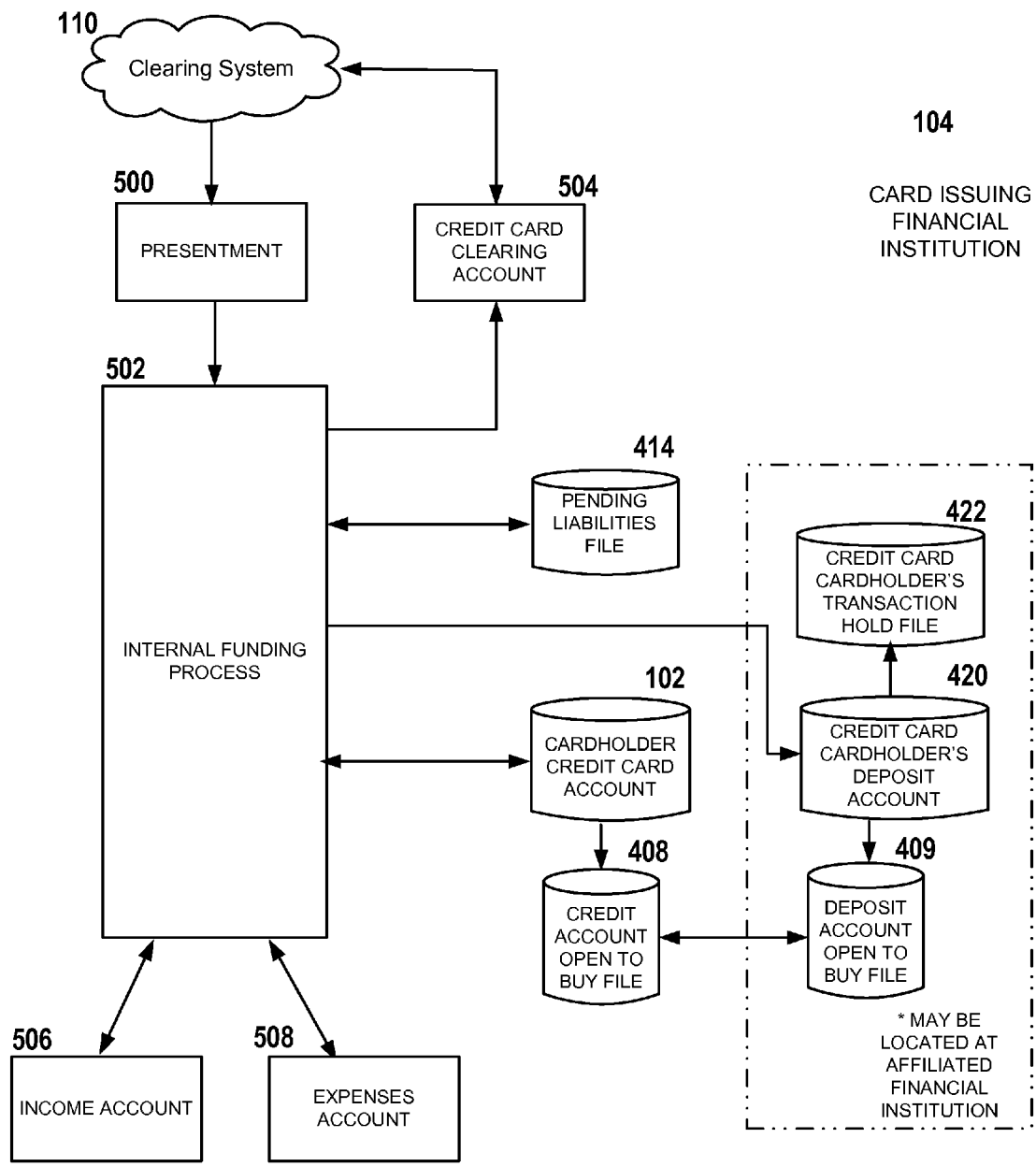
FIG. 8B is a block flow schematic of the card issuing financial institution's internal credit card transaction presentment and accounts postings process according to another embodiment of the invention.

FIG. 8B is a schematic block flow diagram that shows an alternate embodiment to the card issuing financial institution's internal transaction accounts posting processes. In addition to performing the previously described functions shown in FIG. 7, the internal funding process 502 generates a confirmation message, instruction, or similar embodiment to the credit card cardholder's deposit account 420 or similar embodiment for the full amount of the transaction and a release of the uniquely identified charge card transaction hold, memo post, or similar embodiment 422 for all such credit card transactions, and also generates a funds credit to the cardholder's credit card account 102 for an applicable cash advance fee, ATM use fee, or other such fees whether for a purchase, cash advance or other kinds of transaction embodiments from which applicable prior art debits (charge) to the credit card account for crediting and debiting the issuing financial institution's income and expense accounts.

Figure 9:
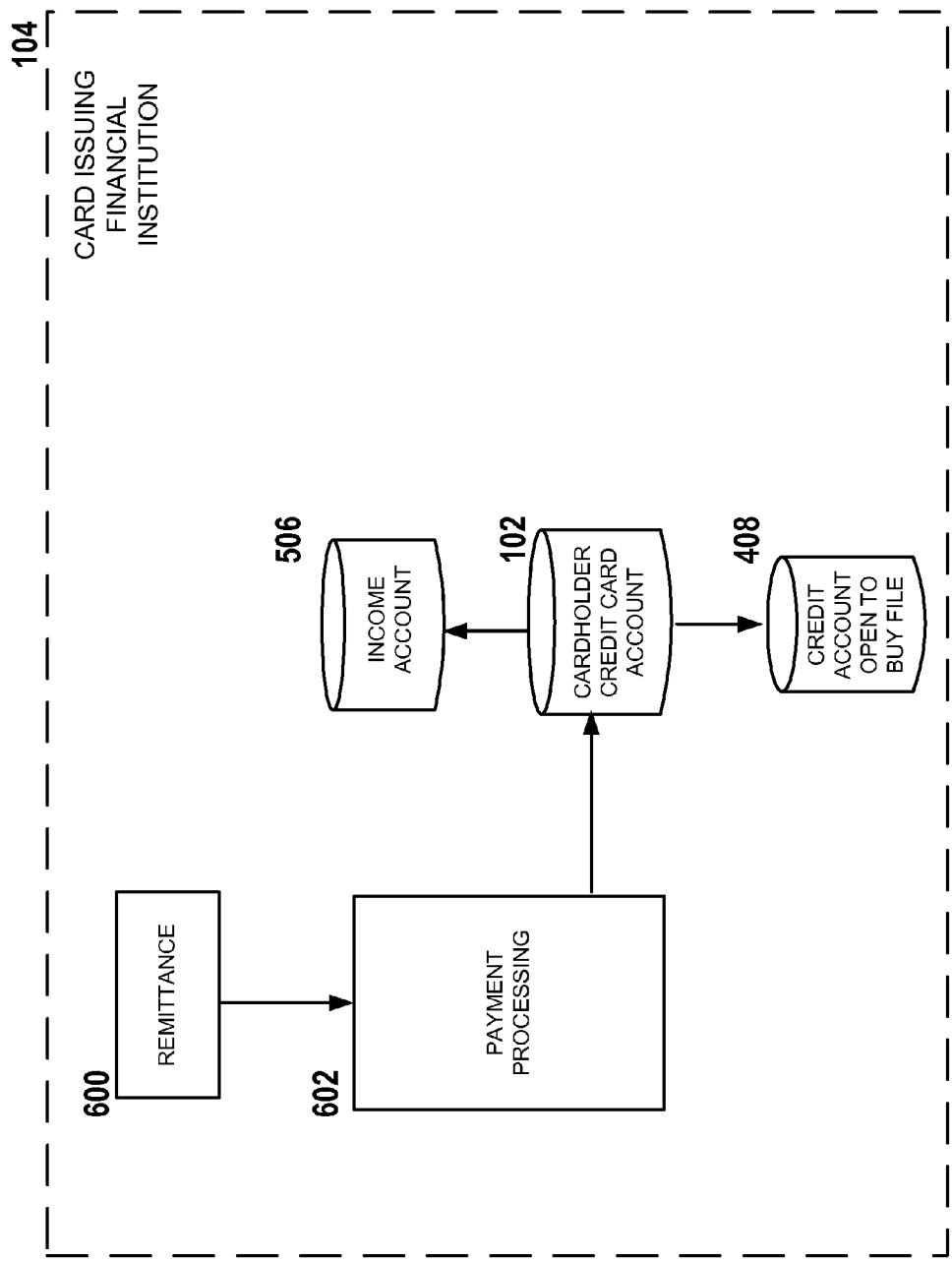
FIG. 9 is a block flow schematic of the card issuing financial institution's internal credit card periodic payment remittance to the credit card cardholder's credit card account according to the prior art.

FIG. 9 is a schematic of the prior art for a card issuing financial institution's internal periodic payment remittance to the cardholder credit card account within the card issuing financial institution or agent processor. A payment remittance 600 is received by the card issuing financial institution 104, remittance agent, agent processor or some other applicable entity. Such remittance may be in the form of a check, automatic or direct debit to any of the credit card cardholder's deposit accounts, other similar embodiments. Payment remittance processing 602 performs (i) a funds credit to the cardholder's credit card account 102 to reduce the outstanding balance in the account or pay it in full, and (ii) enters the debit payment instrument into the appropriate clearing and reconciliation operation (i.e., check "out-clearings") within the payment processing 602 function. The credit card account 102 updates the open to buy file 408 to reflect the new balance. On a periodic schedule, any interest and/or other fees and charges are debited (charged) to the cardholder's credit card account 102 and credited to the card issuing financial institution's applicable income accounts 506.

Figure 10A:
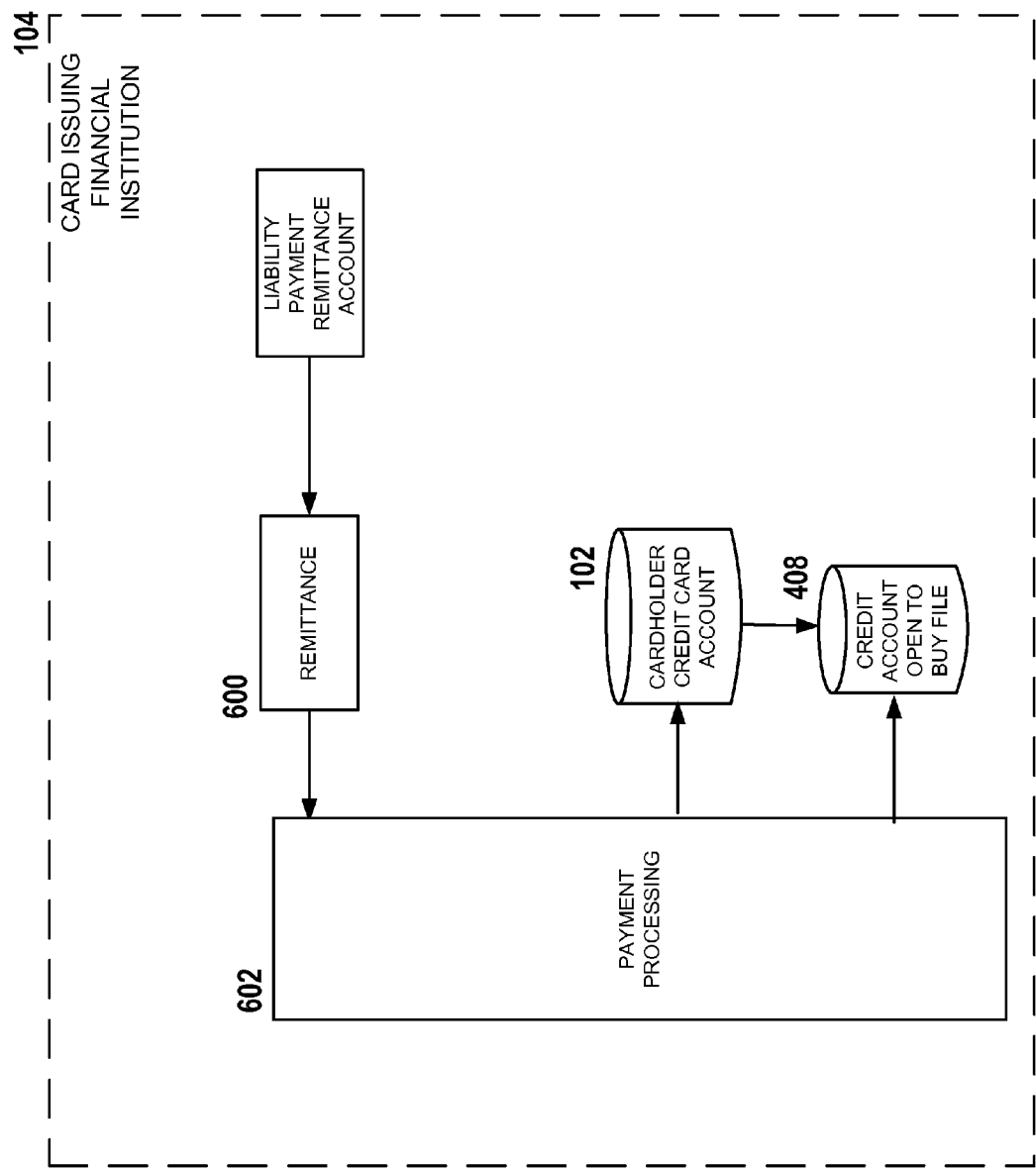
FIG. 10A is a block flow schematic of the card issuing financial institution's internal credit card periodic payment remittance to the credit card cardholder's credit card account according to an embodiment of the invention.

This inventively and substantially alters the payment remittance process within the card issuing financial institution or agent processor as shown in the FIG. 10A schematic. The cardholder's credit card account 102 may not necessarily have a revolving credit feature for unpaid balances. On a periodic schedule, payment processing 602 performs (i) a funds debit (charge) to the liability payment remittance account 510 or similar embodiment, and (ii) credits the cardholder's credit card account 102 for the amount of the payment.

The payment amount may be for the full balance due or portion thereof for transactions posted for a given period of time such as a week, day or several days or by a single transaction posted to the cardholder's credit card account more than one day prior to the scheduled payment. For example, the amount of transactions posted to the credit card cardholder's credit card account on the 4th of a given month in which payment remittance funds in the amount of such transactions are collected from the credit card cardholder's deposit account the next day (5th day of the month) and credited to the issuing financial institution's liability payment remittance account 510 or similar embodiment could be debited from the liability payment remittance account 510 or similar embodiment ten (10) business days later and credited to the cardholder's credit card account 102. Any combination of transaction posting periods and payment remittance periods is possible. The payment remittance processing 602 or the cardholder's credit card account 102 updates the open to buy file 408 to reflect the payment.

Figure 10B:
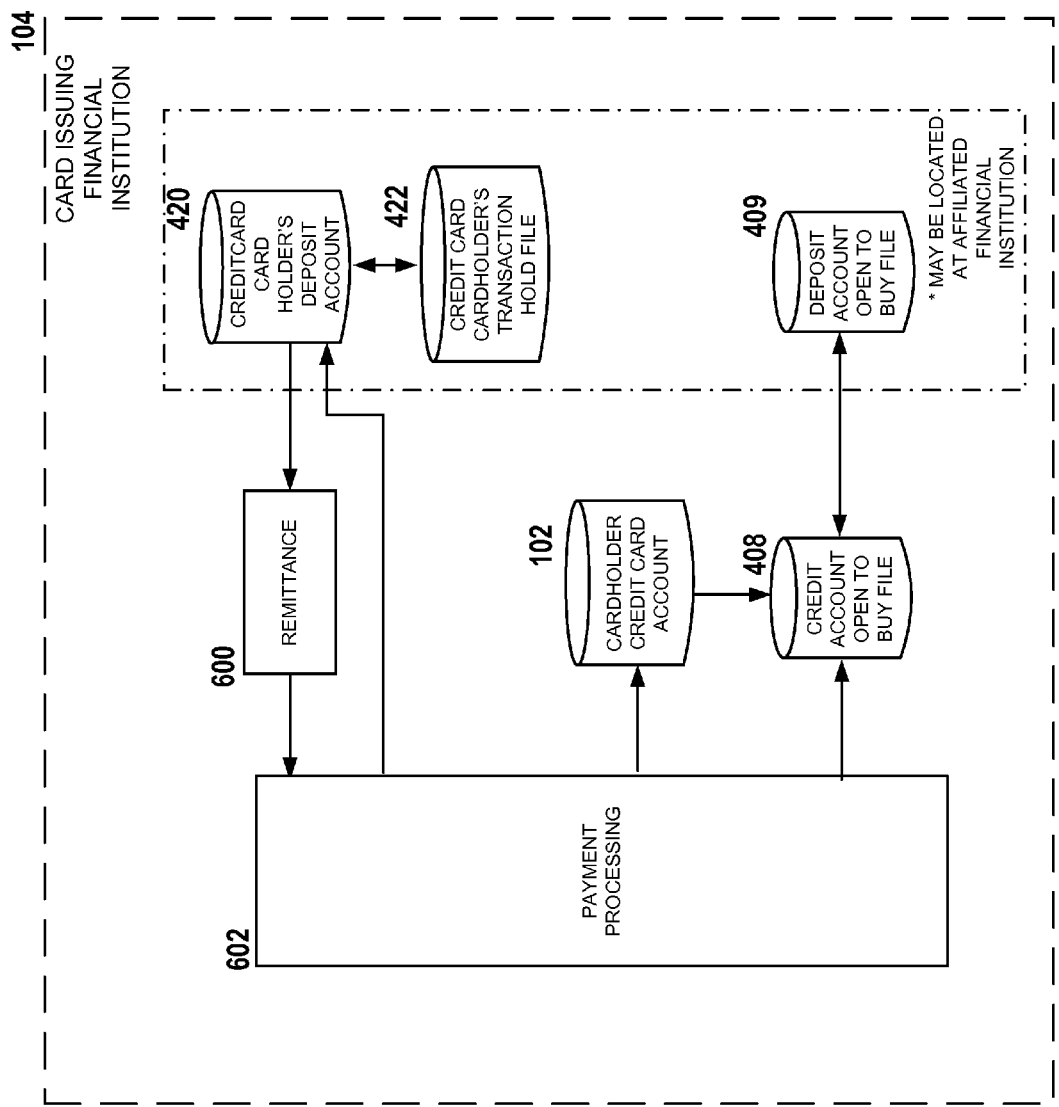
FIG. 10B is a block flow schematic of the card issuing financial institution's use of holds related to the credit card cardholder's credit card account according to another embodiment of the invention.

FIG. 10B is a schematic that illustrates an alternate embodiment remittance processes within the card issuing financial institution or agent processor. The cardholder has several options for remitting payment by accessing available funds in the cardholder's deposit account including check, Internet initiated remittance, telephone authorized remittance transfer, and preauthorized electronic remittance transfers for the minimum payment due or, in the case of the "charge card", the current balance due. The remittance payment amount may be for transactions posted for a given period of time (other than a monthly billing period) such as a week, day or several days. For example, remittance 600 for transactions posted to the "charge card" account on the 5th of the month and uniquely designated as a hold, memo post or other similar embodiment designated in the cardholder's transaction hold file 422 could be debited from the cardholder's deposit account 420 ten (10) business days later and payment processing 602 would credit the remittance 600 to the cardholder's credit card account 102, and thus removing the funds hold by posting the transaction to the cardholder's deposit account 420. Any combination of transaction posting periods and payment remittance periods other than full balance due monthly is possible with this invention. The payment remittance process and any applicable deposit account hold(s) are initiated by the cardholder via a telephone or Internet transfer instruction or a standing preauthorized electronic transfer instruction. The payment remittance processing 602 or the cardholder's credit card account 102 updates the open to buy file 408 to reflect the payment.

The system inventively enables a unique kind of financial institution payment card to be issued that combines the features of a credit card payment device with the operational functionality and cardholder usage behavior of a financial institution issued debit card. A card issuing financial institution can offer consumers a unique, alternative form of secured, credit card or non-revolving "charge card" in which the credit line is dynamically tied to a deposit account of the cardholder. Not only does this deposit account secure the credit line but it also enables timely repayment of transaction balances automatically by a process that (i) places a uniquely identified hold or memo post on deposit funds with each credit card transaction authorization, (ii) confirms such hold or memo post with each presentment of the credit card transaction, (iii) holds such funds for a period of time at the discretion of the card issuing financial institution within the deposit account 420 to help build the outstanding balance of the "charge card" account, and then (iv) upon cardholder instruction transfers such collected funds via an Internet or telephone initiated transfer or a standing preauthorized transfer order to repay accumulated "charge card" balances on a timely periodic basis. Credit card cardholders are then able to establish a history of granted and used credit with a "paid as agreed" rating.

Repayment transfers also may be processed on a more frequent basis using a myriad of flexible schedule and funds amount options selected and established at the discretion of the card issuing financial institution. For example, accumulated repayment funds can be transferred every ten days to pay off the outstanding balance or every ten days for transactions posted ten days earlier. The timing and repayment amount options are numerous.

So-called "secure credit cards" exist in the market today (originally conceived by this inventor at Visa in the mid-1970's and directed at the savings and loan and credit union industries). The intent and overwhelming practice of such programs is to build credit outstanding balance assets to generate finance charge revenue.

In most card issuing financial institution programs in the United States, separate arrangements can be made between the credit card cardholder and the card issuing financial institution to have payments of and against outstanding revolving, non-revolving, and secured credit card accounts automatically paid from deposit account funds. Usually these consist of a single monthly debit to the cardholder's deposit account for a fixed amount, or a variable full balance payment amount or minimum payment amount on revolving credit card accounts. As non-revolving credit card accounts are extremely rare, if any, in the United States, automatic transfer of a single monthly repayment for such accounts is virtually non-existent.

Though classified as a credit card, this card functions and operates much like a debit card, thus enabling consumers to establish, build, or rebuild their credit history in a positive way without fear and temptation of over spending and over extension of credit. The card issuing financial institution is then enabled to collect higher transaction interchange fees for a unique credit card that doesn't incur the same costs for funds, delinquencies, and collections as credit cards with revolving balances, and thus is in a better position to offer a more reasonable service/account fee to a multiple service line customer (credit card and deposit account), The processes disclosed herein also enable the card issuing financial institution to build credit card outstanding balance assets equal to liability deposits of the liability payment remittance account or similar embodiment—a rare if at all benefit in prior art credit card programs. Thus, both asset and liability footings grow equally and positively impact deposit to asset ratios, credit card assets delinquency percentages, and other standard financial institution ratios and reserve requirements.

Implementation is focused and contained within the credit card issuing financial institution or its agent processor and within the deposit account operation of a depository financial institution or its agent processor other than that of the credit card issuing financial institution if the credit card cardholder's deposit account is with a different depository financial institution. No other card transaction participating entities and card system administrating bodies are impacted by these processes. Credit card issuing financial institution operating policies and processes remain the same except for those impacted by the system disclosed herein. The system components and construction comprise of the following:

The credit card issuing financial institution offers consumers and issues either a non-revolving credit card or "convenience" classified credit card with a dynamic credit line equivalent to the balance in the credit card cardholder's selected deposit account. The credit card cardholder agrees that each credit card transaction would result in a hold or memo post on the deposit account equal to the amount of the transaction and that said amount would be held and debited/transferred out of the deposit account equal to the amount of the transaction and that said amount would be held and debited/transferred out according to the card issuing bank's remittance schedule, or when the credit card transaction is presented including any cash advance fees charged by the credit card account.

The credit card issuing financial institution initiates: (i) a daily process for updating the credit card "open to buy" file or similar embodiment with the prior day's collected balance in the credit card cardholder's deposit account, (ii) a realtime process for the credit card transaction authorization system to initiate a "hold" or memo post to the deposit account in the amount for each authorized transaction, and (iii) a process to debit or charge the deposit account for the amount of each or a group of presented transactions on a periodic basis.

The credit card issuing financial institution performs the following in one embodiment. First, it opens or establishes a special internal liability account (liability payment remittance account) to which debited funds from the credit card cardholder's deposit account equal to presented and settled transactions on the credit card are deposited and held for subsequent transfer to the credit card account as payment against the outstanding balance.

Second, it determines the schedule and amount levels for transferring funds from this account to the cardholder's credit card account for payment against the outstanding balance in a manner and frequency that enables the credit card balance to grow within the account on a less than a standard monthly cycle basis so that transferred payment retires the balance on a timely basis. Such a policy can have payment transfers made every few days, weekly, bi-weekly, a set number of days after transactions have been posted, any schedule frequency and level that meets the credit card issuing financial institution's objectives.

In another embodiment, the credit card issuing financial institution (i) establishes a special or uniquely identified hold or memo post classification within the cardholder's deposit account for presented and settled transactions on the credit card for subsequent transfer to the credit card account as payment against the outstanding balance, and (ii) determines the schedule and amount levels for transferring funds from this account to the cardholder's credit card account for payment against the outstanding balance in a manner and frequency that enables the credit card balance to grow within the account on a less than a standard monthly cycle basis so that transferred payment retires the balance on a timely basis. Such a policy can have payment transfers made every few days, weekly, bi-weekly, a set number of days after transactions have been posted, any schedule frequency and level that meets the credit card issuing financial institution's objectives.

In one embodiment, the credit card issuing financial institution determines a policy and process for accessing the liability payment remittance account for charge-back transactions and repudiate transactions for crediting back to the credit card cardholder's deposit account.

In another embodiment, the credit card issuing financial institution determines a policy and process for accessing the cardholder's deposit account for charge-back transactions and repudiate transactions for crediting back to the credit card cardholder's deposit account.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

TABLE OF REFERENCE CHARACTERS

100 Credit Card Cardholder
102 Cardholder Credit Card Account
104 Card Issuing Financial Institution
106 Merchant
108 Acquirer
110 Clearing System
112 Merchant's Account
120 Card Issuing Financial Institution's Income Account
400 Authorization Request from Clearing System
402 Credit Card Authorization System
404 Cardholder PIN Code File
406 Negative File
408 Open to Buy File
410 Authorization Code Generation
414 Pending Liability File
416 Authorization Log
418 Authorization Approval/Decline Code to Clearing System
420 Credit Card Cardholder Deposit Account
422 Credit Card Cardholder's Transaction Hold File
500 Presentment
502 Internal Funding Process
504 Credit Card Clearing Account
506 Income Account
508 Expenses Account
510 Liability Payment Remittance Account
600 Remittance
602 Payment Processing

What is claimed is:

1. A method for authorizing a financial transaction of a consumer, comprising: in an account establishment phase:
   issuing a credit card to a cardholder by a card-issuing financial institution;
   creating a credit card account associated with the card and the cardholder;
   creating or designating a deposit account associated with the cardholder;
   creating a liability payment remittance account associated with the cardholder;
   associating in a database in a memory of a computer system the credit card with the deposit account and the payment remittance account; and
   placing or crediting cardholder money in the deposit account;

in a transaction authorization phase:
receiving a request for authorization for a transaction from a clearing system via a network connected to the clearing system by the card-issuing financial institution;
accessing an open to buy file, using a computer processor, to determine if adequate resources exist to complete the transaction, wherein the open to buy file reflects financial aspects of both the card account and the deposit account; and
if adequate resources exist, then:
authorizing, using the computer processor, a purchase transaction; and
transferring funds, utilizing the computer processor, from the deposit account to the payment remittance account;
thereby building an outstanding balance on the credit card account;
in a payment processing phase, after a predetermined period of time or presentment of the card account balance due:
applying, using the computer system, a funds debit or charge to the payment remittance account; and
crediting, using the computer system, the credit card account for an amount of payment.

2. The method of claim 1, further comprising repetitively or periodically reporting a "paid as agreed" event to a credit reporting agency.

3. The method of claim 1, further comprising initiating a purchase transaction for a purchase amount by the credit card cardholder with a merchant by using the credit card in a terminal located at a merchant or a cash advance from an attended bank teller terminal or unattended automated teller machine (ATM).

4. The method of claim 1, further comprising requesting the authorization for the transaction by the payment card electronic clearing system.

5. The method of claim 1, wherein the credit card account is selected from the group consisting of: a) a revolving credit card account enabled to function as a non-revolving credit card account; b) a conventional credit card account; and c) a charge card account.

6. The method of claim 1, wherein placing the money in the deposit account is performed by the card-issuing financial institution in response to a deposit by the credit card cardholder.

7. A method for authorizing a financial transaction of a consumer, comprising: in an account establishment phase:
issuing a card to a cardholder by a card-issuing financial institution; creating a card account associated with the card and the cardholder; creating a deposit account associated with the cardholder;
creating a unique identifier for card transaction holds on the cardholder deposit account by way of a separate data store associated with the cardholder;
associating in a database in a memory of a computer system the credit card with the deposit account and any transaction hold data store; and
placing or crediting cardholder money in the deposit account;
in a transaction authorization phase:
receiving a request for authorization for a transaction from a clearing system by the card-issuing financial institution;
accessing an open to buy file, using a computer processor, to determine if adequate resources exist to complete the transaction, wherein the open to buy file reflects financial aspects of both the card account and the deposit account; and
if adequate resources exist, then:
placing a card transaction remittance hold on the deposit account in a cardholder credit card transaction hold data store; and
authorizing a purchase transaction;
thereby building an outstanding balance on the credit card account;
in a payment processing phase, after (a1) a predetermined period of time or (a2) presentment of the credit card account balance due and (b) upon cardholder instruction:
applying a funds debit or charge to the deposit account; removing applicable said transaction hold; and crediting the credit card account for an amount of payment.

8. The method of claim 7, wherein, prior to the presentment of the credit card account balance due or payment remittance thereof, specific transaction amounts can be deducted or charged from the liability payment remittance account and credited to the deposit account or the credit card transaction remittance hold removed from the deposit account or cardholder credit card transaction hold file upon cardholder instruction pursuant to a process to dispute a card transaction resulting in a charge-back.

9. The method of claim 7, wherein a plurality of card transaction remittance holds, each uniquely identified, are placed on the deposit account.

10. The method of claim 7, the cardholder instruction is provided via automatic transfer, check, telephone, or an online banking initiated payment remittance order.

11. The method of claim 7, further comprising repetitively or periodically electronically reporting a "paid as agreed" event to a credit reporting agency.

12. The method of claim 7, further comprising initiating a purchase transaction for a purchase amount by the credit card cardholder with a merchant by using the card in a terminal located at a merchant or a cash advance from an attended bank teller terminal or unattended ATM.

13. The method of claim 7, further comprising requesting the authorization for the transaction by the payment card electronic clearing system.

14. The method of claim 7, wherein the credit card account is selected from the group consisting of: a) a revolving credit card account enabled to function as a non-revolving credit card account; b) a conventional credit card account; and c) a charge card account.

15. The method of claim 7, wherein placing the money in the deposit account is performed by the card-issuing financial institution in response to a deposit by the cardholder.

16. A method for authorizing a credit card financial transaction of a consumer and assuring timely full payment remittance of subsequently billed transaction charges, comprising:
in an account establishment phase:
issuing a credit card to a cardholder by a card-issuing financial institution; creating a credit card account associated with the credit card and the cardholder; creating or designating a deposit account associated with the cardholder;
creating a deposit for liability remittance account associated with the cardholder or a remittance trust account to which cardholder deposit funds are electronically transferred via at least one of the Internet and intranet telecommunications using a computer processor and held for subsequent payment remittance to the cardholder's credit card account;
establishing necessary account information and data on the financial institution's computer processing capability or processors;

creating a unique identifier for card transaction holds that include memo posts or pending transactions on the cardholder deposit account computer processing file as part of such file or by way of a separate data file store associated with the cardholder;
associating credit card transactions as transaction hold and/or memo post data within the deposit account or any transaction hold data store;
crediting cardholder money in the deposit account;
establishing a credit line that is a spending limit in an open to buy file, using a computer processor, that reflects financial aspects of the cardholder's deposit account and periodically throughout each 24-hour day accessing via at least one of the Internet and an intranet the financial aspects of the cardholder's deposit account to update said open to buy file;
in a transaction authorization phase:
receiving a request for authorization for a credit card transaction from a bank card electronic transmission clearing system by the credit card-issuing financial institution pursuant to the card's use at a merchant terminal, financial institution teller terminal, or ATM;
accessing electronically an open to buy file, using a computer processor, to determine if an adequate credit line exists to complete the transaction, wherein the open to buy file reflects financial aspects of the credit card account and daily frequent periodic updated financial aspects of the deposit account; and
if adequate resources exist, then:
authorizing the credit card transaction and debiting the credit card account, using a computer processor, upon presentation of the transaction when received from the electronic clearing system, thereby building an outstanding balance on the credit card account;
placing electronically a uniquely identified credit card transaction hold on the deposit account or a cardholder credit card transaction hold data store, using a computer processor; and
reconciling, using a computer processor via at least one of the Internet and intranet facility access, uniquely identified credit card transaction hold data in the deposit account with transaction data in the credit card account and transforming the collective transaction hold data to electronically transferred money via at least one of the Internet and intranet transmission facility from the cardholder's deposit account to the cardholder's remittance deposit account or financial institution remittance trust account at the same financial institution or via at least one of an intranet and another proprietary electronic clearing and settlement system to another financial institution, and thereby removing said applicable holds; and
in a payment processing phase, after a predetermined period of time or presentment of the card account balance due:
applying a funds debit or charge to the payment remittance account and crediting the credit card account for an amount of payment.

17. A method for authorizing a credit card financial transaction of a consumer and assuring timely full payment remittance of subsequently billed transaction charges, comprising:
in an account establishment phase:
issuing a credit card to a cardholder by a card-issuing financial institution; creating a credit card account associated with the card and the cardholder; creating or designating a deposit account associated with the cardholder;
creating a deposit for liability remittance account associated with the cardholder or a remittance trust account to which cardholder deposit funds are electronically transferred via at least one of the Internet and intranet telecommunications using a computer processor and held for subsequent payment remittance to the cardholder's credit card account;
establishing necessary account information and data on the financial institution's computer processing capability or processors;
creating a unique identifier for card transaction holds using memo posts or pending transactions on the cardholder deposit account computer processing file as part of such file or by way of a separate data file store associated with the cardholder;
associating credit card transactions as at least one of a transaction hold and a memo post data within the deposit account or any transaction hold data store;
crediting cardholder money in the deposit account;
establishing a credit line that is a spending limit in an open to buy file, using a computer processor, that reflects financial aspects of the cardholder's deposit account and periodically throughout each 24-hour day accessing via internet and/or intranet the financial aspects of the cardholder's deposit account to update said open to buy file;
in a transaction authorization phase:
receiving a request for authorization for a credit card transaction from a bank card electronic transmission clearing system by the credit card-issuing financial institution pursuant to the card's use at a merchant terminal, financial institution teller terminal, or ATM;
accessing electronically the open to buy file, using a computer processor, to determine if an adequate credit line exists to complete the transaction, wherein the open to buy file reflects financial aspects of the credit card account and daily frequent periodic updated financial aspects of the deposit account; and
if adequate resources exist, then:
authorizing the credit card transaction and debiting the credit card account, using a computer processor, upon presentation of the transaction when received from the electronic clearing system, thereby building an outstanding balance on the credit card account;
placing electronically a uniquely identified credit card transaction hold on the deposit account or a cardholder credit card transaction hold data store, using a computer processor; and
reconciling, using a computer processor via at least one of the Internet and intranet facility access, uniquely identified credit card transaction hold data in the deposit account with transaction data in the credit card account and transforming the collective transaction hold data to electronically transferred money via at least one of the Internet and an intranet transmission facility from the cardholder's deposit account to the cardholder's remittance deposit account or financial institution remittance trust account at the same financial institution or via at least on of an intranet and another proprietary electronic clearing and settlement system to another financial institution, and thereby removing said applicable holds;
in a payment processing phase, after: (a1) a predetermined period of time, or (a2) presentment of the credit card account balance due and (b) upon cardholder instruction:
applying funds debit or charge (a) to the cardholder's deposit account in the amount of reconciled holds; removing any applicable said transaction holds; or (b) to the cardholder's remittance deposit account or financial institution remittance trust account;

and, using a computer processor, crediting the credit card account for an amount of payment from funds in said deposit or remittance accounts and removing applicable credit card account transaction holds in the credit card open to buy file.

* * * * *